(12) United States Patent
Venkataraman et al.

(10) Patent No.: US 12,273,940 B2
(45) Date of Patent: Apr. 8, 2025

(54) 5G NR VOICE CALL EPS FALLBACK ENHANCEMENTS

(71) Applicant: Apple Inc., Cupertino, CA (US)

(72) Inventors: Vijay Venkataraman, San Jose, CA (US); Krisztian Kiss, Hayward, CA (US); Shashikant Tiwari, Sunnyvale, CA (US); Srinivasan Nimmala, San Jose, CA (US); Lakshmi N. Kavuri, Cupertino, CA (US); Shivani Suresh Babu, San Jose, CA (US); Sree Ram Kodali, Sunnyvale, CA (US); Sridhar Prakasam, Freemont, CA (US); Stephen C. Schweizer, Mountain View, CA (US); Yifan Zhu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 330 days.

(21) Appl. No.: 16/992,741

(22) Filed: Aug. 13, 2020

(65) Prior Publication Data

US 2021/0051530 A1 Feb. 18, 2021

Related U.S. Application Data

(60) Provisional application No. 62/888,078, filed on Aug. 16, 2019.

(51) Int. Cl.
*H04W 88/06* (2009.01)
*H04L 65/1053* (2022.01)
(Continued)

(52) U.S. Cl.
CPC .......... *H04W 76/12* (2018.02); *H04L 65/1053* (2013.01); *H04L 65/1104* (2022.05);
(Continued)

(58) Field of Classification Search
CPC ............ H04L 65/1006; H04L 65/1016; H04L 65/1053; H04L 65/1069; H04L 65/1073;
(Continued)

(56) References Cited

U.S. PATENT DOCUMENTS 10,178,585 B2 1/2019 Huang-Fu et al.
10,237,681 B2 3/2019 Kim et al.
(Continued)

FOREIGN PATENT DOCUMENTS

CN 106131895 11/2016
CN 106686565 5/2017
(Continued)

OTHER PUBLICATIONS

Extended European Search Report for EP Application 20000297.0-1212, dated Jan. 13, 2021, 16 pages.
(Continued)

*Primary Examiner* — Syed Ali
(74) *Attorney, Agent, or Firm* — Kowert, Hood, Munyon, Rankin & Goetzel, P.C.

(57) ABSTRACT

Apparatuses, systems, and methods for a user equipment device (UE) to perform methods for EPS fallback when initiating a voice call while camped on a 5G cell. The UE may camp on a 5G network by performing an IMS registration procedure/IMS SIP invite procedure with an IMS. The UE may initiate a voice call and determine that the voice call cannot be established over the 5G NR network. In response, the UE may perform a TAU procedure or an attachment procedure with a cell of a 4G network. The IMS may be transferred to the 4G network during TAU/attachment procedure. The UE may, in response to determining that it is barred from the 4G network, transition back to the
(Continued)

5G network and transmit, to the 5G NR network, a SIP cancel request to allow a context associated with the UE to be cleared from the IMS.

20 Claims, 24 Drawing Sheets

(51) Int. Cl.
    *H04L 65/1104*     (2022.01)
    *H04M 7/00*     (2006.01)
    *H04W 48/18*     (2009.01)
    *H04W 76/12*     (2018.01)

(52) U.S. Cl.
    CPC ........... *H04M 7/006* (2013.01); *H04W 48/18* (2013.01); *H04W 88/06* (2013.01)

(58) Field of Classification Search
    CPC . H04M 7/006; H04W 36/0022; H04W 48/18; H04W 76/12; H04W 80/10; H04W 88/06
    See application file for complete search history.

(56) References Cited

U.S. PATENT DOCUMENTS

| | | |
|---|---|---|
| 10,477,607 B2 | 11/2019 | Buckley et al. |
| 10,492,243 B2 | 11/2019 | Chiang et al. |
| 2011/0171924 A1* | 7/2011 | Faccin .................... H04W 4/90 455/404.1 |
| 2011/0171926 A1* | 7/2011 | Faccin .................. H04W 48/18 455/404.1 |
| 2014/0307616 A1* | 10/2014 | Hwang ................. H04W 72/30 370/312 |
| 2015/0003342 A1* | 1/2015 | Swaminathan ....... H04W 76/18 370/329 |
| 2015/0009887 A1* | 1/2015 | Chen ..................... H04W 48/12 370/312 |
| 2015/0230092 A1* | 8/2015 | Ueki ..................... H04W 48/02 455/411 |
| 2016/0373977 A1* | 12/2016 | Sripada ................. H04W 48/18 |
| 2017/0135031 A1* | 5/2017 | Buckley ................ H04W 48/18 |
| 2017/0215227 A1* | 7/2017 | Duan .................... H04W 48/16 |
| 2017/0331861 A1* | 11/2017 | Kotecha .............. H04L 65/1063 |
| 2017/0366955 A1* | 12/2017 | Edge ...................... H04M 11/04 |
| 2018/0132141 A1* | 5/2018 | Huang-Fu ........... H04L 65/1083 |
| 2018/0279204 A1* | 9/2018 | Kim .................. H04W 52/0229 |
| 2018/0338295 A1* | 11/2018 | Lin ....................... H04W 4/025 |
| 2019/0029058 A1* | 1/2019 | Russell ................. H04W 48/17 |
| 2019/0116483 A1* | 4/2019 | Ryu ...................... H04W 4/029 |
| 2019/0191349 A1* | 6/2019 | Kim ...................... H04W 76/18 |
| 2019/0268732 A1* | 8/2019 | Lu ........................ H04W 48/02 |
| 2019/0281506 A1* | 9/2019 | Chiang ................. H04W 12/71 |
| 2019/0297541 A1 | 9/2019 | Chandramouli et al. |
| 2019/0335534 A1* | 10/2019 | Atarius ............... H04L 65/1016 |
| 2019/0373441 A1* | 12/2019 | Ryu ...................... H04W 48/18 |
| 2020/0008134 A1* | 1/2020 | Wallentin ................ H04L 63/10 |
| 2020/0015128 A1 | 1/2020 | Stojanovski et al. |
| 2020/0084691 A1* | 3/2020 | Wallentin .............. H04W 48/02 |
| 2020/0204676 A1* | 6/2020 | Chiang ............... H04M 3/2227 |
| 2020/0359191 A1* | 11/2020 | Rugeland ................ H04W 8/02 |
| 2021/0204180 A1* | 7/2021 | Chun .................... H04W 48/18 |
| 2024/0276576 A1* | 8/2024 | Wang ...................... H04L 65/65 |

FOREIGN PATENT DOCUMENTS

| | | |
|---|---|---|
| CN | 109392010 | 2/2019 |
| EP | 3506680 A1 | 7/2019 |
| WO | WO2019196799 A1 | 10/2019 |

OTHER PUBLICATIONS

3rd Generation Partnership Project; Technical Specification Group Services and System Aspects; Procedures for the 5G System; Stage 2, 3GPP TS 23.502 v16.1.1, Jun. 2019, 495 pages.

Qualcomm Incorporated et al., Way forward on EPC-NG Core Interworking, SA WG@ Meeting #117, S2-166263, Oct. 17-21, 2016, 4 pages.

Office Action for CN Patent Application No. 202010824696.5; Mar. 1, 2024.

* cited by examiner

5G NR VOICE CALL EPS FALLBACK ENHANCEMENTS

PRIORITY DATA

This application claims benefit of priority to U.S. Provisional Application Ser. No. 62/888,078, titled "5G NR Voice Call EPS Fallback Enhancements", filed Aug. 16, 2019, which is hereby incorporated by reference in its entirety as though fully and completely set forth herein.

FIELD

The present application relates to wireless devices, and more particularly to apparatuses, systems, and methods for 3GPP 5G NR voice call fallback to Evolved Packet System (EPS) enhancements.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from medium access control (MAC) and higher layers. LTE also defines a number of physical layer channels for the uplink (UL).

For example, LTE defines a Physical Downlink Shared Channel (PDSCH) as a DL transport channel. The PDSCH is the main data-bearing channel allocated to users on a dynamic and opportunistic basis. The PDSCH carries data in Transport Blocks (TB) corresponding to a MAC protocol data unit (PDU), passed from the MAC layer to the physical (PHY) layer once per Transmission Time Interval (TTI). The PDSCH is also used to transmit broadcast information such as System Information Blocks (SIB) and paging messages.

As another example, LTE defines a Physical Downlink Control Channel (PDCCH) as a DL control channel that carries the resource assignment for UEs that are contained in a Downlink Control Information (DCI) message. Multiple PDCCHs can be transmitted in the same subframe using Control Channel Elements (CCE), each of which is a nine set of four resource elements known as Resource Element Groups (REG). The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

Additionally, LTE defines a Physical Uplink Shared Channel (PUSCH) as a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

A proposed next telecommunications standard moving beyond the current International Mobile Telecommunications-Advanced (IMT-Advanced) Standards is called 5th generation mobile networks or 5th generation wireless systems, or 5G for short (otherwise known as 5G-NR for 5G New Radio, also simply referred to as NR). 5G-NR proposes a higher capacity for a higher density of mobile broadband users, also supporting device-to-device, ultra-reliable, and massive machine communications, as well as lower latency and lower battery consumption, than current LTE standards. Further, the 5G-NR standard may allow for less restrictive UE scheduling as compared to current LTE standards. Consequently, efforts are being made in ongoing developments of 5G-NR to take advantage of higher throughputs possible at higher frequencies.

SUMMARY

Embodiments relate to apparatuses, systems, and methods for 5G NR voice call fallback to Evolved Packet System (EPS) enhancements.

In some embodiments, a wireless device, e.g., such as a user equipment device (UE), may be configured to camp on a cell (e.g., such as gNB 604) of a 5G NR network, including performing one or more of an IMS registration procedure or an IMS SIP invite procedure with an IMS serving the 5G NR network. The UE may be configured to initiate a voice call (e.g., over the 5G NR network) and determine that the voice call cannot be established over the 5G NR network. In response, the UE may be configured to perform one of a TAU procedure or an attachment procedure with a cell of a 4G network and the IMS may be transferred to the 4G network during one of the TAU procedure or attachment procedure. The UE may be configured to omit, prior to establishing the voice call over the 4G network, one or more of an IMS registration procedure or a SIP invite procedure with the IMS. In some embodiments, in response to determining that the UE is barred from the 4G network, the UE may be configured to transition back to the 5G NR network and transmit, to the 5G NR network, a SIP cancel request to allow a context associated with the UE to be cleared from the IMS.

In some embodiments, a wireless device, e.g., such as a user equipment device (UE), may be configured to camp on a cell (e.g., such as gNB 604) of a 5G NR network, including performing one or more of an IMS registration procedure or an IMS SIP invite procedure with an IMS serving the 5G NR network. The UE may be configured to, in response to determining that the 5G NR network does not support voice calls, collect a list of 4G frequencies and cells that support VoPS co-located with the 5G NR cell. The frequencies and cells may be collected base one at least one of frequencies sent by the 5G NR network in re-direction and/or handover during EPS fallback, past 4G attach and/or TAU procedures performed on a 4G cell co-located with the 5G NR cell, and/or a 4G frequency list received from an AP Assisted Cell Search (APACS) server. The UE may be configured to, upon initiation of the voice call, use the collected 4G frequencies to search for and camp on a selected 4G cell to proceed with the voice call.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1A:
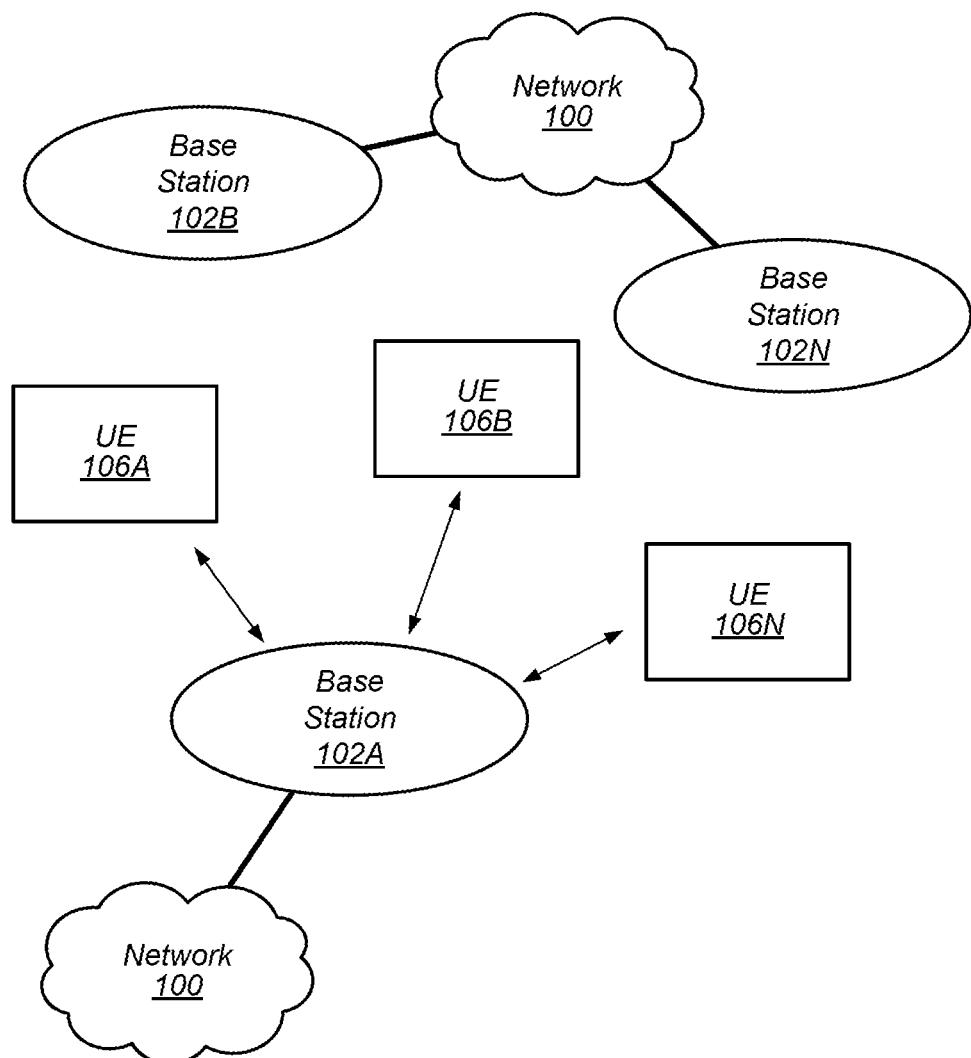
FIG. 1A illustrates an example wireless communication system according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications.

Examples of UE devices include mobile telephones or smart phones (e.g., iPhone™, Android™-based phones), portable gaming devices (e.g., Nintendo DS™ Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Figure 1B:
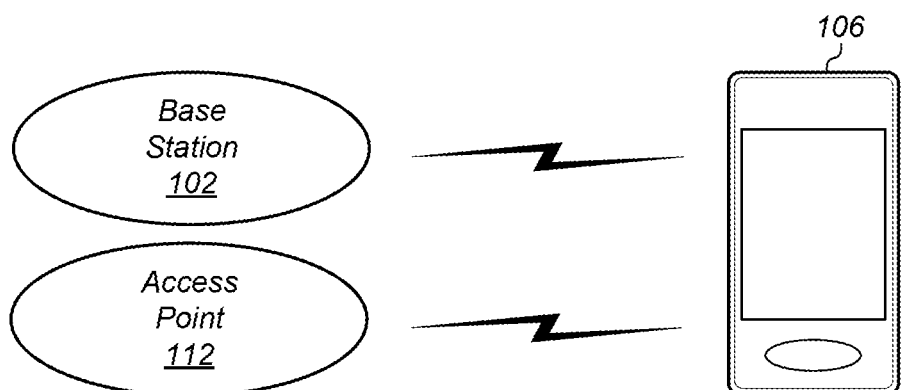
FIG. 1B illustrates an example of a base station (BS) and an access point in communication with a user equipment (UE) device according to some embodiments.

FIGS. 1A and 1B—Communication Systems

FIG. 1A illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as 'gNodeB' or 'gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 1B illustrates user equipment 106 (e.g., one of the devices 106A through 106N) in communication with a base station 102 and an access point 112, according to some embodiments. The UE 106 may be a device with both cellular communication capability and non-cellular communication capability (e.g., Bluetooth, Wi-Fi, and so forth) such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD), LTE/LTE-Advanced, or 5G NR using a single shared radio and/or GSM, LTE, LTE-Advanced, or 5G NR using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 2:
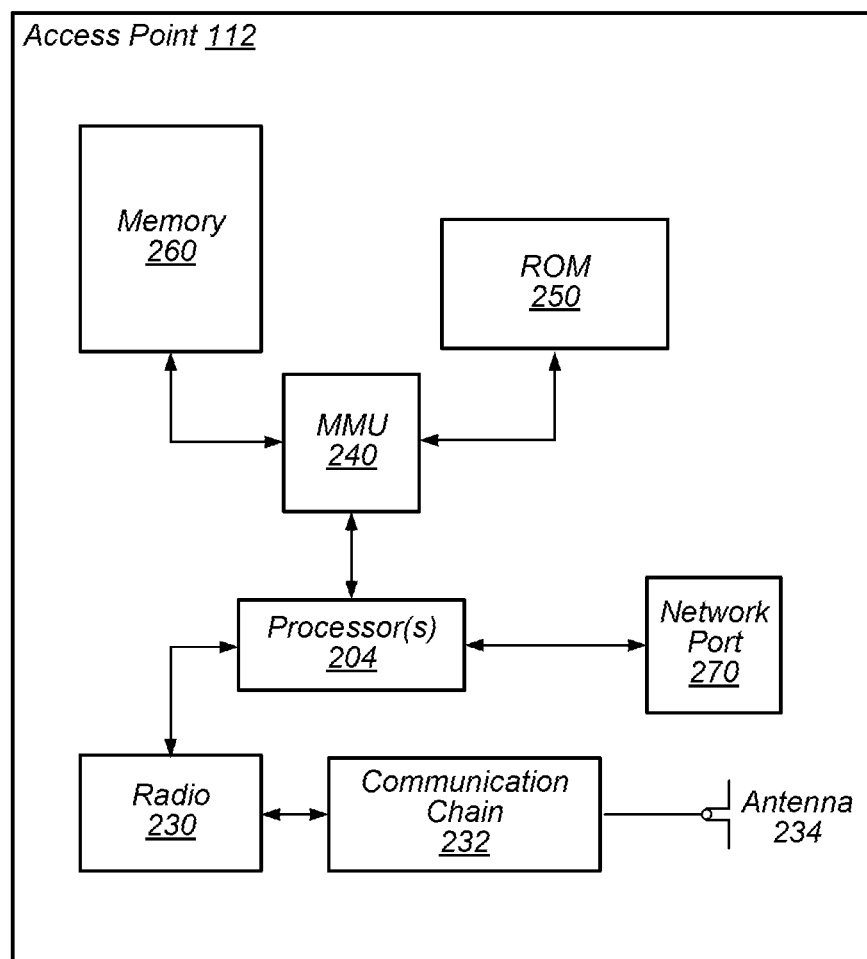
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as UEs 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with UE 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, 5G NR, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, an AP 112 may be configured to perform methods for 5G NR voice call fallback to Evolved Packet System (EPS) enhancements as further described herein.

Figure 3:
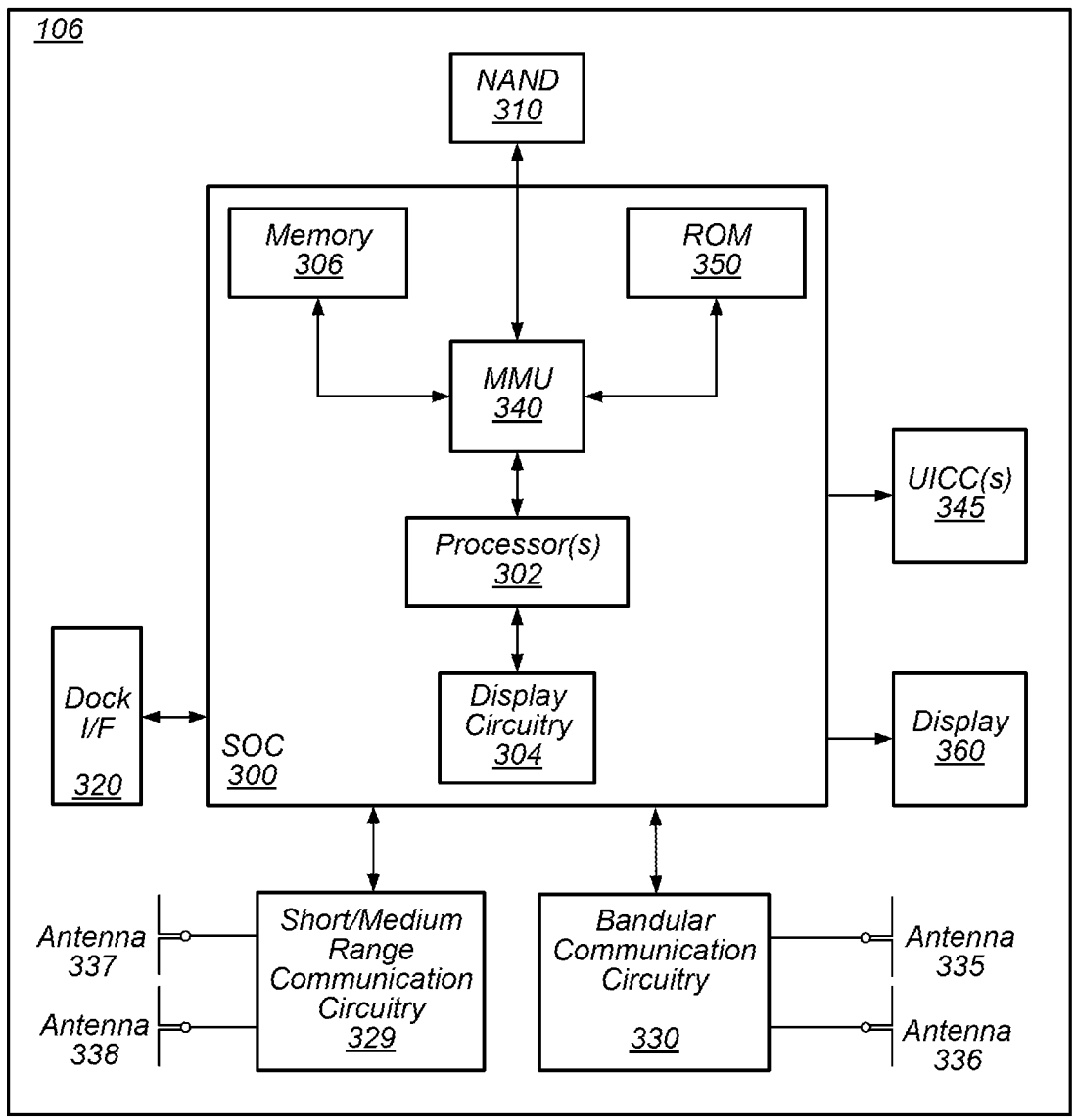
FIG. 3 illustrates an example block diagram of a UE according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short to medium range wireless communication circuitry 329, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to perform methods for 5G NR voice call fallback to Evolved Packet System (EPS) enhancements as further described herein.

As described herein, the communication device 106 may include hardware and software components for implementing the above features for a communication device 106 to communicate a scheduling profile for power savings to a network. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short to medium range wireless communication circuitry 329 may each include one or more processing elements. In other words, one or more processing elements may be included in cellular communication circuitry 330 and, similarly, one or more processing elements may be included in short to medium range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short to medium range wireless communication circuitry 329 may include one or more ICs that are configured to perform the functions of short to medium range wireless communication circuitry 329. In addition, each integrated circuit may include circuitry (e.g., first circuitry, second circuitry, etc.) configured to perform the functions of short to medium range wireless communication circuitry 329.

Figure 4:
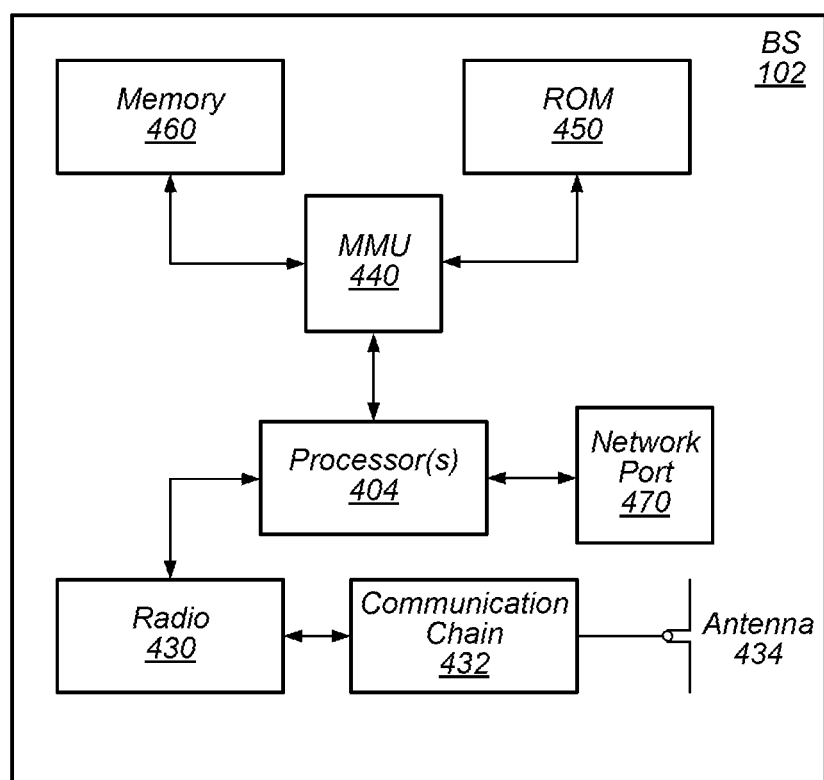
FIG. 4 illustrates an example block diagram of a BS according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNB s.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
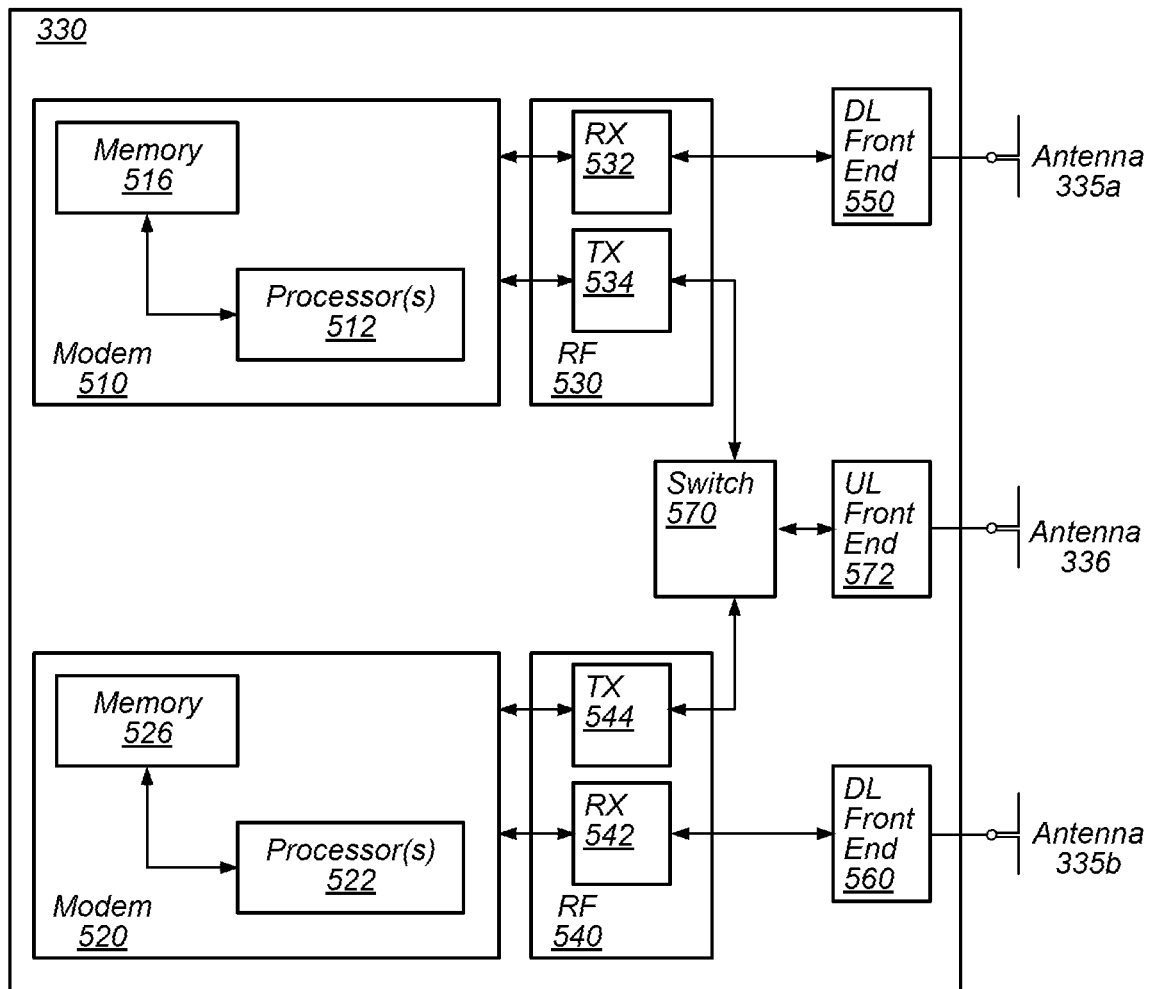
FIG. 5 illustrates an example block diagram of cellular communication circuitry, according to some embodiments.

FIG. 5: Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to perform methods for 5G NR voice call fallback to Evolved Packet System (EPS) enhancements as further described herein.

As described herein, the modem 510 may include hardware and software components for implementing the above features or for time division multiplexing UL data for NSA NR operations, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for communicating a scheduling profile for power savings to a network, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

5G NR Architecture with LTE

Figure 6A:
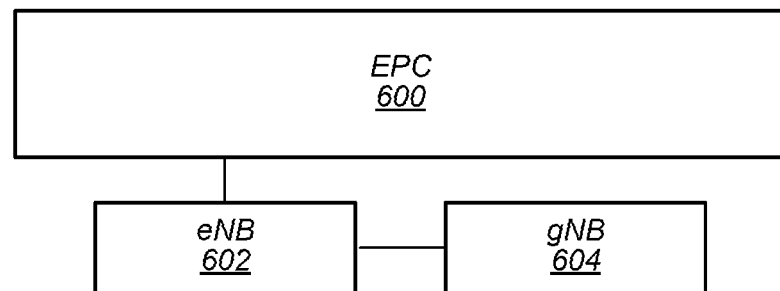
FIG. 6A illustrates an example of connections between an EPC network, an LTE base station (eNB), and a 5G NR base station (gNB).
Figure 6B:
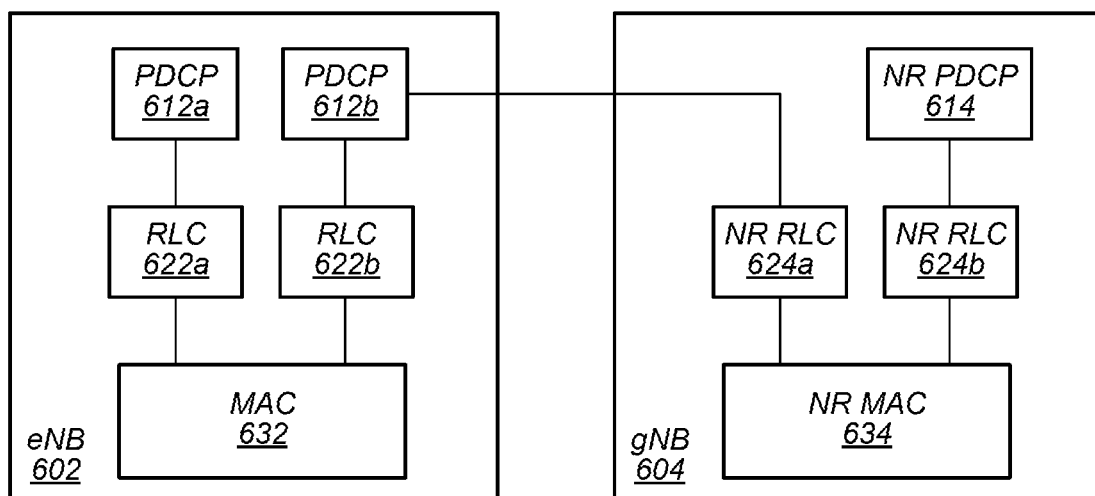
FIG. 6B illustrates an example of a protocol stack for an eNB and a gNB.

In some implementations, fifth generation (5G) wireless communication will initially be deployed concurrently with current wireless communication standards (e.g., LTE). For example, dual connectivity between LTE and 5G new radio (5G NR or NR) has been specified as part of the initial deployment of NR. Thus, as illustrated in FIGS. 6A-B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services.

FIG. 6B illustrates a proposed protocol stack for eNB 602 and gNB 604. As shown, eNB 602 may include a medium access control (MAC) layer 632 that interfaces with radio link control (RLC) layers 622a-b. RLC layer 622a may also interface with packet data convergence protocol (PDCP) layer 612a and RLC layer 622b may interface with PDCP layer 612b. Similar to dual connectivity as specified in LTE-Advanced Release 12, PDCP layer 612a may interface via a master cell group (MCG) bearer with EPC network 600 whereas PDCP layer 612b may interface via a split bearer with EPC network 600.

Additionally, as shown, gNB 604 may include a MAC layer 634 that interfaces with RLC layers 624a-b. RLC layer 624a may interface with PDCP layer 612b of eNB 602 via an $X_2$ interface for information exchange and/or coordination (e.g., scheduling of a UE) between eNB 602 and gNB 604. In addition, RLC layer 624b may interface with PDCP layer 614. Similar to dual connectivity as specified in LTE-Advanced Release 12, PDCP layer 614 may interface with EPC network 600 via a secondary cell group (SCG) bearer. Thus, eNB 602 may be considered a master node (MeNB) while gNB 604 may be considered a secondary node (SgNB). In some scenarios, a UE may be required to maintain a connection to both an MeNB and a SgNB. In such scenarios, the MeNB may be used to maintain a radio resource control (RRC) connection to an EPC while the SgNB may be used for capacity (e.g., additional downlink and/or uplink throughput).

5G Core Network Architecture—Interworking with Wi-Fi

Figure 7A:
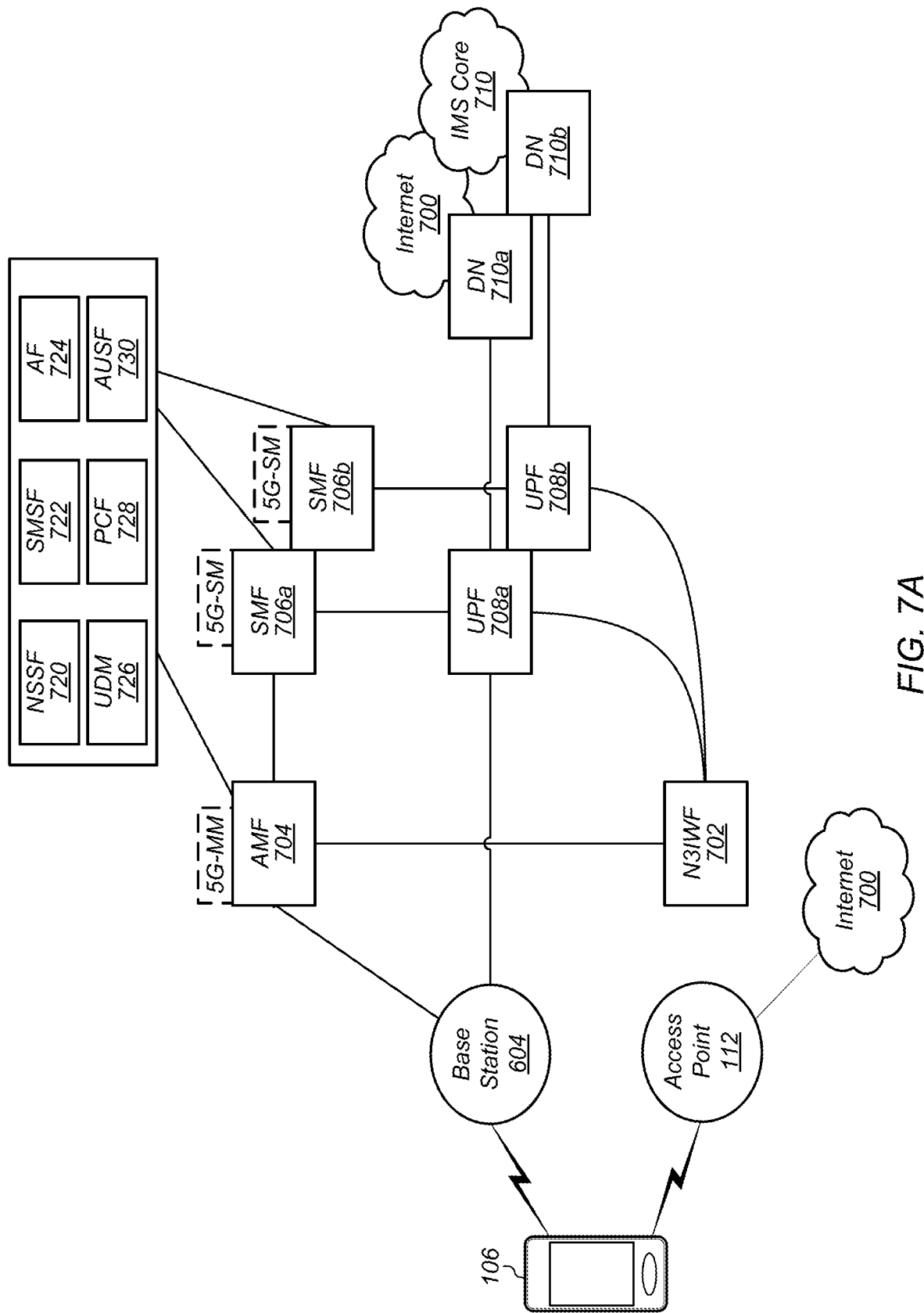
FIG. 7A illustrates an example of a 5G network architecture that incorporates both 3GPP (e.g., cellular) and non-3GPP (e.g., non-cellular) access to the 5G CN, according to some embodiments.

In some embodiments, the 5G core network (CN) may be accessed via (or through) a cellular connection/interface (e.g., via a 3GPP communication architecture/protocol) and a non-cellular connection/interface (e.g., a non-3GPP access architecture/protocol such as Wi-Fi connection). FIG. 7A illustrates an example of a 5G network architecture that incorporates both 3GPP (e.g., cellular) and non-3GPP (e.g., non-cellular) access to the 5G CN, according to some embodiments. As shown, a user equipment device (e.g., such as UE 106) may access the 5G CN through both a radio access network (RAN, e.g., such as gNB or base station 604) and an access point, such as AP 112. The AP 112 may include a connection to the Internet 700 as well as a connection to a non-3GPP inter-working function (N3IWF) 702 network entity. The N3IWF may include a connection to a core access and mobility management function (AMF) 704 of the 5G CN. The AMF 704 may include an instance of a 5G mobility management (5G MM) function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. As shown, the AMF 704 may include one or more functional entities associated with the 5G CN (e.g., network slice selection function (NSSF) 720, short message service function (SMSF) 722, application function (AF) 724, unified data management (UDM) 726, policy control function (PCF) 728, and/or authentication server function (AUSF) 730). Note that these functional entities may also be supported by a session management function (SMF) 706a and an SMF 706b of the 5G CN. The AMF 706 may be connected to (or in communication with) the SMF 706a. Further, the gNB 604 may in communication with (or connected to) a user plane function (UPF) 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Figure 7B:
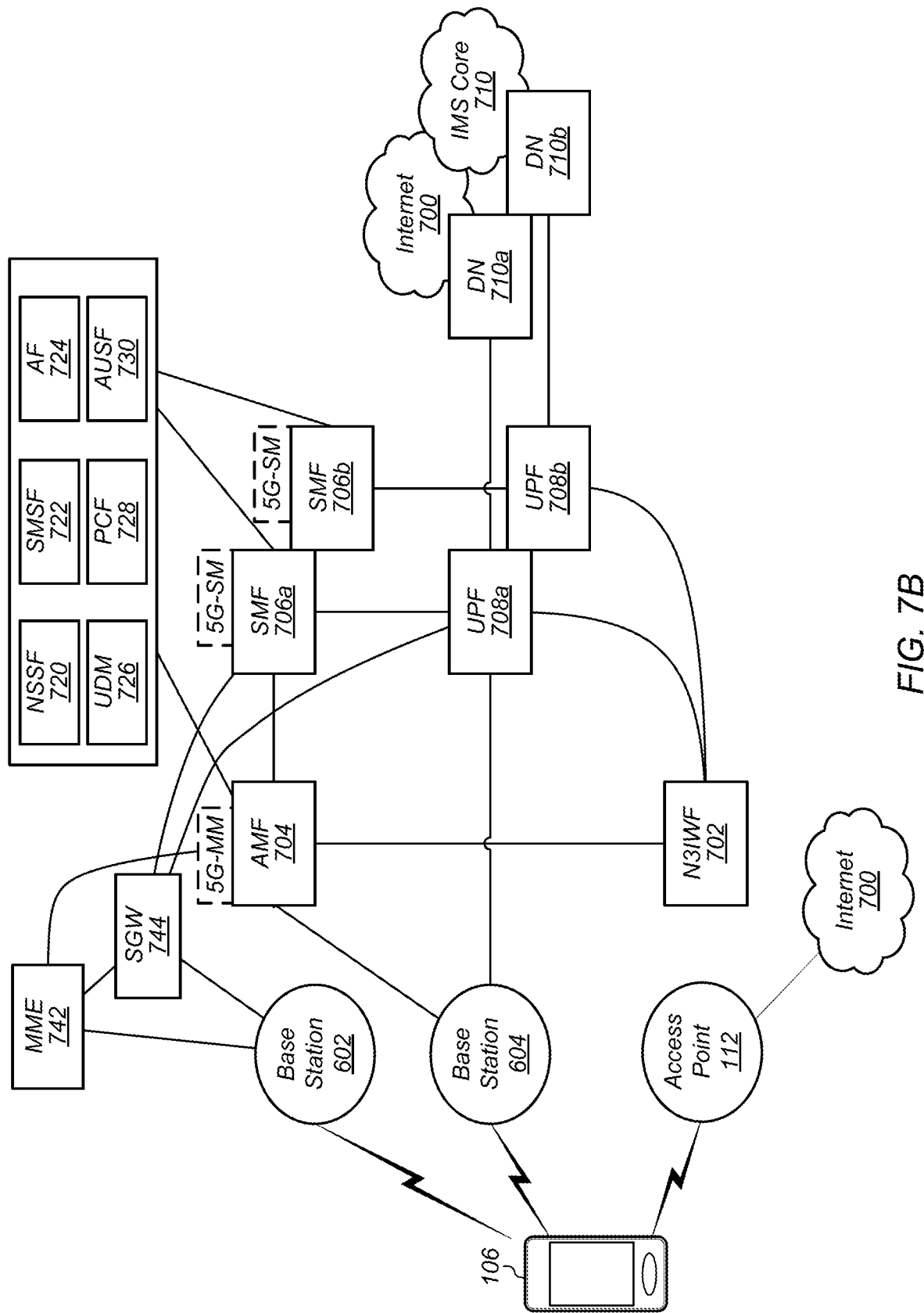
FIG. 7B illustrates an example of a 5G network architecture that incorporates both dual 3GPP (e.g., LTE and 5G NR) access and non-3GPP access to the 5G CN, according to some embodiments.

FIG. 7B illustrates an example of a 5G network architecture that incorporates both dual 3GPP (e.g., LTE and 5G NR) access and non-3GPP access to the 5G CN, according to some embodiments. As shown, a user equipment device (e.g., such as UE 106) may access the 5G CN through both a radio access network (RAN, e.g., such as gNB or base station 604 or eNB or base station 602) and an access point, such as AP 112. The AP 112 may include a connection to the Internet 700 as well as a connection to the N3IWF 702 network entity. The N3IWF may include a connection to the AMF 704 of the 5G CN. The AMF 704 may include an instance of the 5G MM function associated with the UE 106. In addition, the RAN (e.g., gNB 604) may also have a connection to the AMF 704. Thus, the 5G CN may support unified authentication over both connections as well as allow simultaneous registration for UE 106 access via both gNB 604 and AP 112. In addition, the 5G CN may support dual-registration of the UE on both a legacy network (e.g., LTE via base station 602) and a 5G network (e.g., via base station 604). As shown, the base station 602 may have connections to a mobility management entity (MME) 742 and a serving gateway (SGW) 744. The MME 742 may have connections to both the SGW 744 and the AMF 704. In addition, the SGW 744 may have connections to both the SMF 706a and the UPF 708a. As shown, the AMF 704 may include one or more functional entities associated with the 5G CN (e.g., NSSF 720, SMSF 722, AF 724, UDM 726, PCF 728, and/or AUSF 730). Note that UDM 726 may also include a home subscriber server (HSS) function and the PCF may also include a policy and charging rules function (PCRF). Note further that these functional entities may also be supported by the SMF 706a and the SMF 706b of the 5G CN. The AMF 706 may be connected to (or in communication with) the SMF 706a. Further, the gNB 604 may in communication with (or connected to) the UPF 708a that may also be communication with the SMF 706a. Similarly, the N3IWF 702 may be communicating with a UPF 708b that may also be communicating with the SMF 706b. Both UPFs may be communicating with the data network (e.g., DN 710a and 710b) and/or the Internet 700 and IMS core network 710.

Note that in various embodiments, one or more of the above described network entities may be configured to perform methods to improve security checks in a 5G NR network, including mechanisms for 5G NR voice call fallback to Evolved Packet System (EPS) enhancements, e.g., as further described herein.

Figure 8:
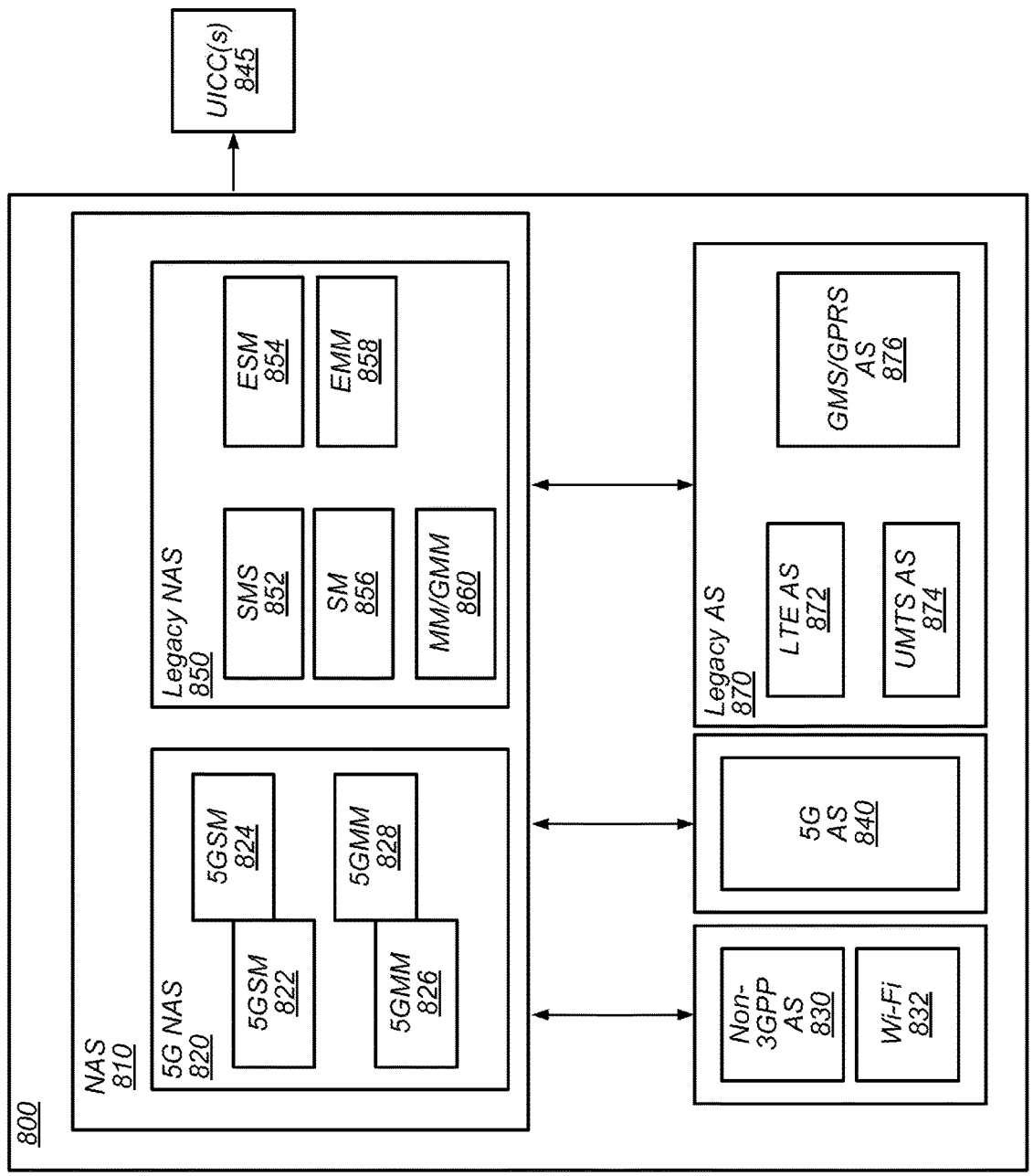
FIG. 8 illustrates an example of a baseband processor architecture for a UE, according to some embodiments.

FIG. 8 illustrates an example of a baseband processor architecture for a UE (e.g., such as UE 106), according to some embodiments. The baseband processor architecture 800 described in FIG. 8 may be implemented on one or more radios (e.g., radios 329 and/or 330 described above) or modems (e.g., modems 510 and/or 520) as described above. As shown, the non-access stratum (NAS) 810 may include a 5G NAS 820 and a legacy NAS 850. The legacy NAS 850 may include a communication connection with a legacy access stratum (AS) 870. The 5G NAS 820 may include communication connections with both a 5G AS 840 and a non-3GPP AS 830 and Wi-Fi AS 832. The 5G NAS 820 may include functional entities associated with both access stratums. Thus, the 5G NAS 820 may include multiple 5G MM entities 826 and 828 and 5G session management (SM) entities 822 and 824. The legacy NAS 850 may include functional entities such as short message service (SMS) entity 852, evolved packet system (EPS) session management (ESM) entity 854, session management (SM) entity 856, EPS mobility management (EMM) entity 858, and mobility management (MM)/GPRS mobility management (GMM) entity 860. In addition, the legacy AS 870 may include functional entities such as LTE AS 872, UMTS AS 874, and/or GSM/GPRS AS 876.

Thus, the baseband processor architecture 800 allows for a common 5G-NAS for both 5G cellular and non-cellular (e.g., non-3GPP access). Note that as shown, the 5G MM may maintain individual connection management and registration management state machines for each connection. Additionally, a device (e.g., UE 106) may register to a single PLMN (e.g., 5G CN) using 5G cellular access as well as non-cellular access. Further, it may be possible for the device to be in a connected state in one access and an idle state in another access and vice versa. Finally, there may be common 5G-MM procedures (e.g., registration, de-registration, identification, authentication, as so forth) for both accesses.

Note that in various embodiments, one or more of the above described functional entities of the 5G NAS and/or 5G AS may be configured to perform methods for 5G NR voice call fallback to Evolved Packet System (EPS) enhancements, e.g., as further described herein.

Voice Call EPS Fallback Enhancements

Figure 9A:
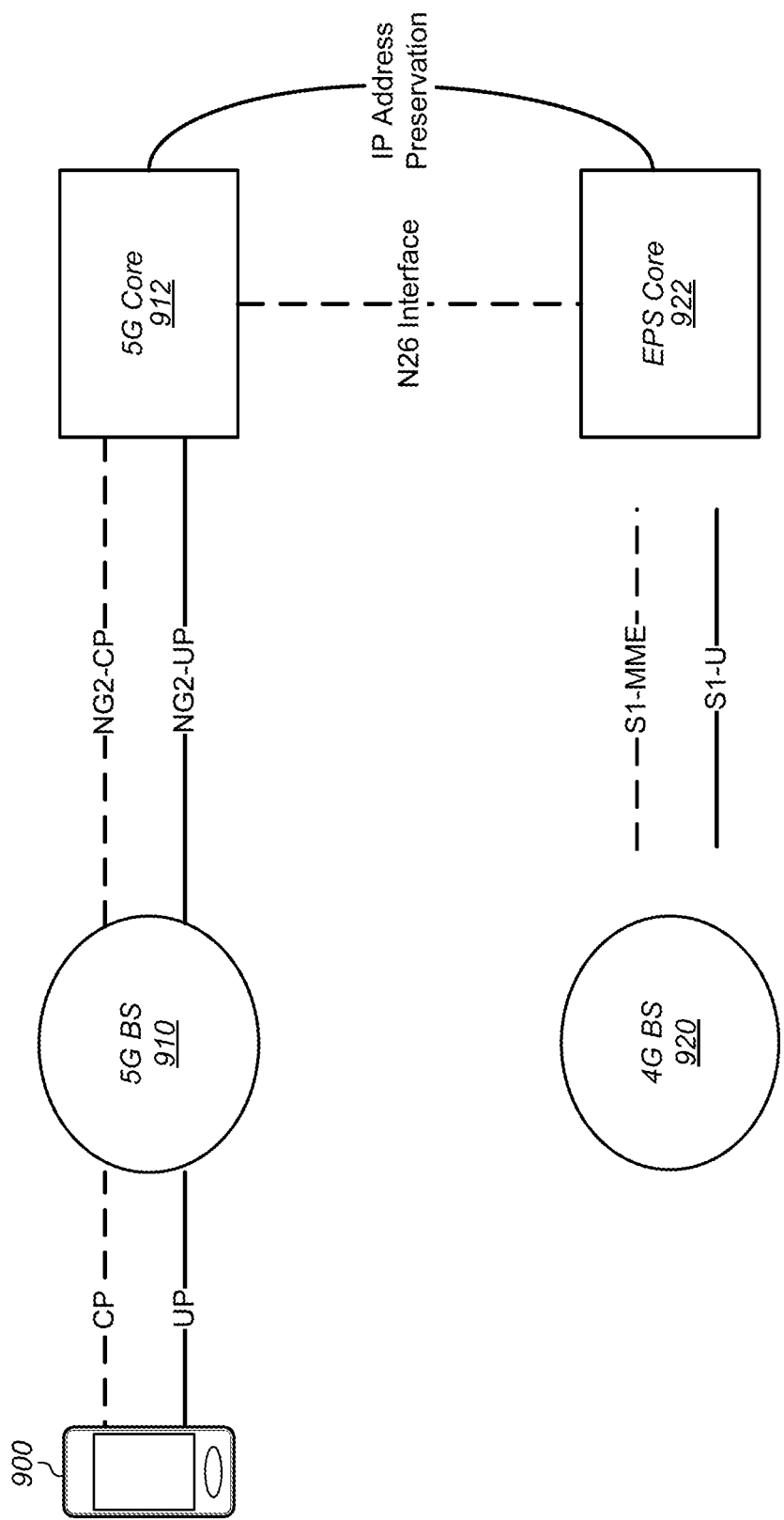
FIGS. 9A-9C illustrate examples of connection architectures between a mobile, a 4G network, and a 5G network.

In current implementations, a mobile station, such as a user equipment device (UE), may operate in a stand-alone mode on a 5G radio access network, such as 5G NR, or in a non-stand-alone mode. In stand-alone mode, the mobile station may have a single registration that is coordinated between a 5G core and an Evolved Packet System (EPS) core. For example, as illustrated by FIG. 9A, a mobile station, such as UE 900 may maintain a control plane (CP) and user plane (UP) connection with a 5G base station 910. The 5G base station 910 may maintain a control plane connection (over an NG2 interface) and a user plane connection (over an NG3 interface) with 5G core 912. The 5G core may (optionally) interface with EPS core 922 via an N26 interface. Such an interface between the 5G core and the EPS core may allow the mobile station to have Internet Protocol (IP) address preservation as the mobile station moves between radio access networks (RANs). For example, upon a RAN change from 5G to 4G, the mobile station may perform a tracking area update (TAU) or attach procedure (e.g., depending on N26 interface support) to transfer packet data networks (PDN) and IP address preservation.

Figure 9B:
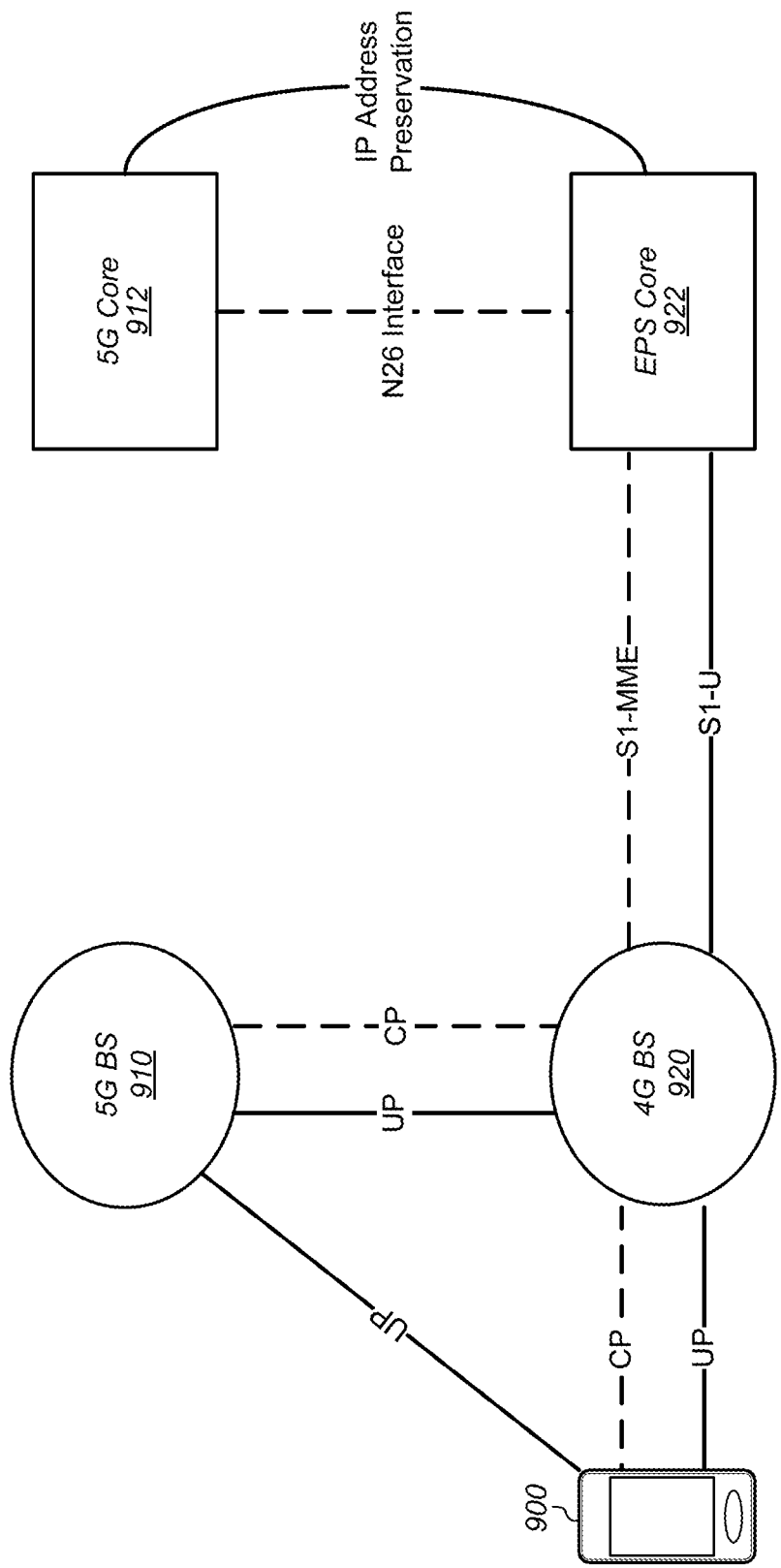

Additionally, to support voice calling on mobile stations capable of working with 5G NR, current implementations provide multiple options. For example, in non-stand-alone mode, the mobile station may proceed with a voice over LTE (VoLTE) call while supporting active secondary cell group (SCG) bearers on a user plane link with a 5G base station (e.g., to support data). For example, as illustrated by FIG. 9B, the UE 900 may maintain a control plane (CP) and user plane (UP) connection with a 4G base station 920. Additionally, the UE 900 may maintain a user plane connection with the 5G base station 910. The 4G base station 910 may have both user plane and control plane connections with the 5G base station 910. Additionally, the 4G base station 910 may maintain a control plane connection (over an S1-MME interface) and a user plane connection (over an S1-U interface) with EPS core 922. The EPS core may (optionally) interface with EPS core 922 via an N26 interface. Thus, when making a VoLTE call in non-stand-alone mode, the call may proceed via the 4G network.

Alternatively, in stand-alone mode, the mobile station may proceed with a voice over NR (VoNR) call, if supported by both the 5G RAN as well as the mobile station. However, when VoNR is not supported by either the 5G RAN or the mobile station, the mobile station may fall back to EPS upon voice call initiation. In such implementations, if the N26 interface is supported, the mobile station may be redirected (or handed-over) to the 4G base station and may perform a tracking area update (TAU) procedure to continue with the call over VoLTE. However, if the N26 interface is not supported, the mobile station may be redirected to the 4G base station and may perform an LTE attachment procedure (e.g., with a hand-over flag set) to continue with the call over VoLTE. In either scenario, there may be delays (at times, significant, e.g., noticeable to a user) in the voice call establishment.

Figure 9C:
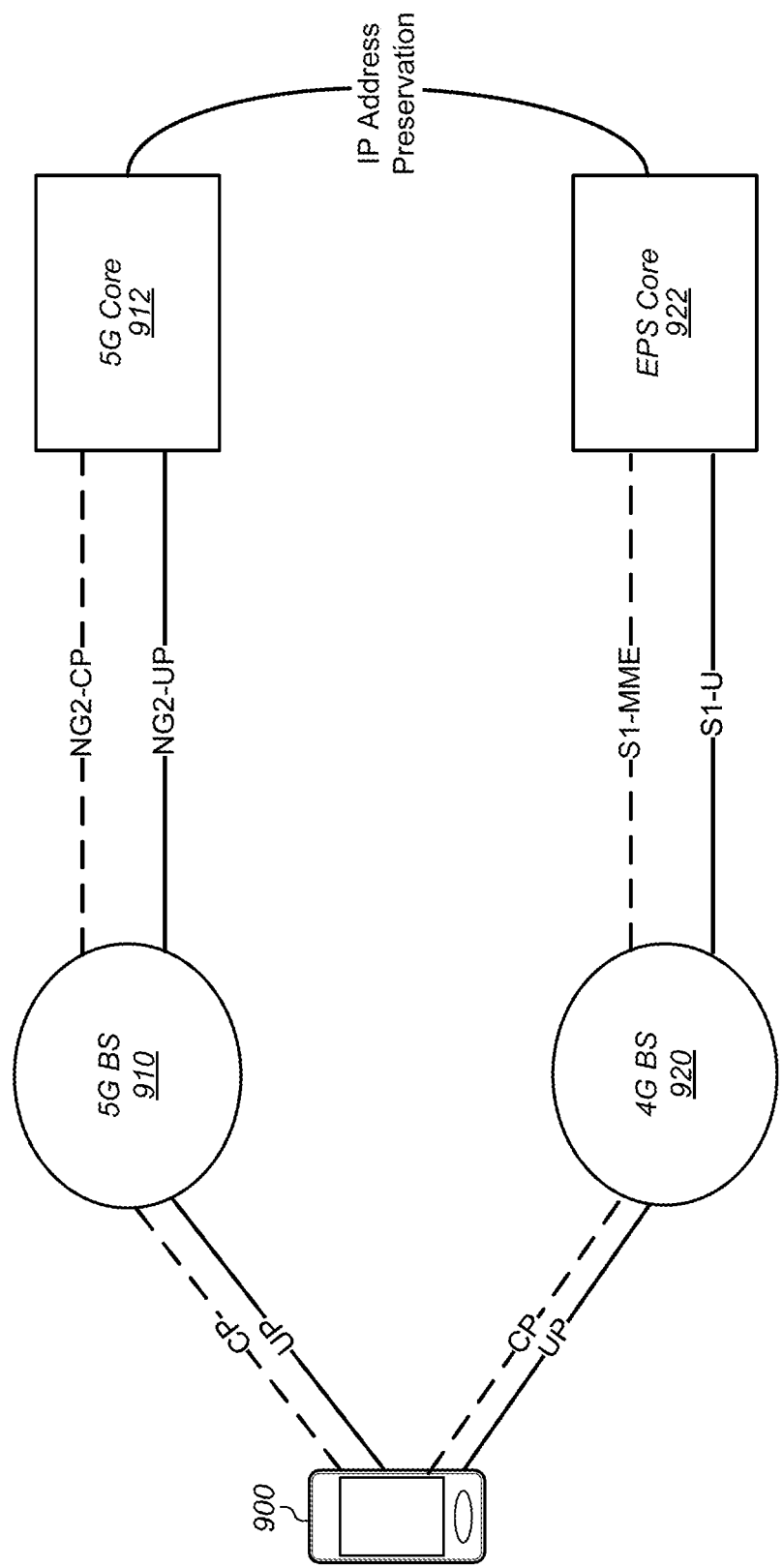

As another option where an N26 interface is not supported, a wireless device may be configured for dual registration, e.g., as illustrated by FIG. 9C. In such implementations, the UE 900 may have independent registrations on both the 4G and 5G network. This may require dual transmitters (e.g., a transmitter dedicated to the 4G connection and a transmitter dedicated to the 5G connection) or the UE 900 may be configured to share a single transmitter between the connections with tune-away. In such implementations, the UE 900 may use the 4G connection for voice calls (e.g., VoLTE) and the 5G connection for data, e.g., similar to the non-stand-alone scenario.

Figure 10A:
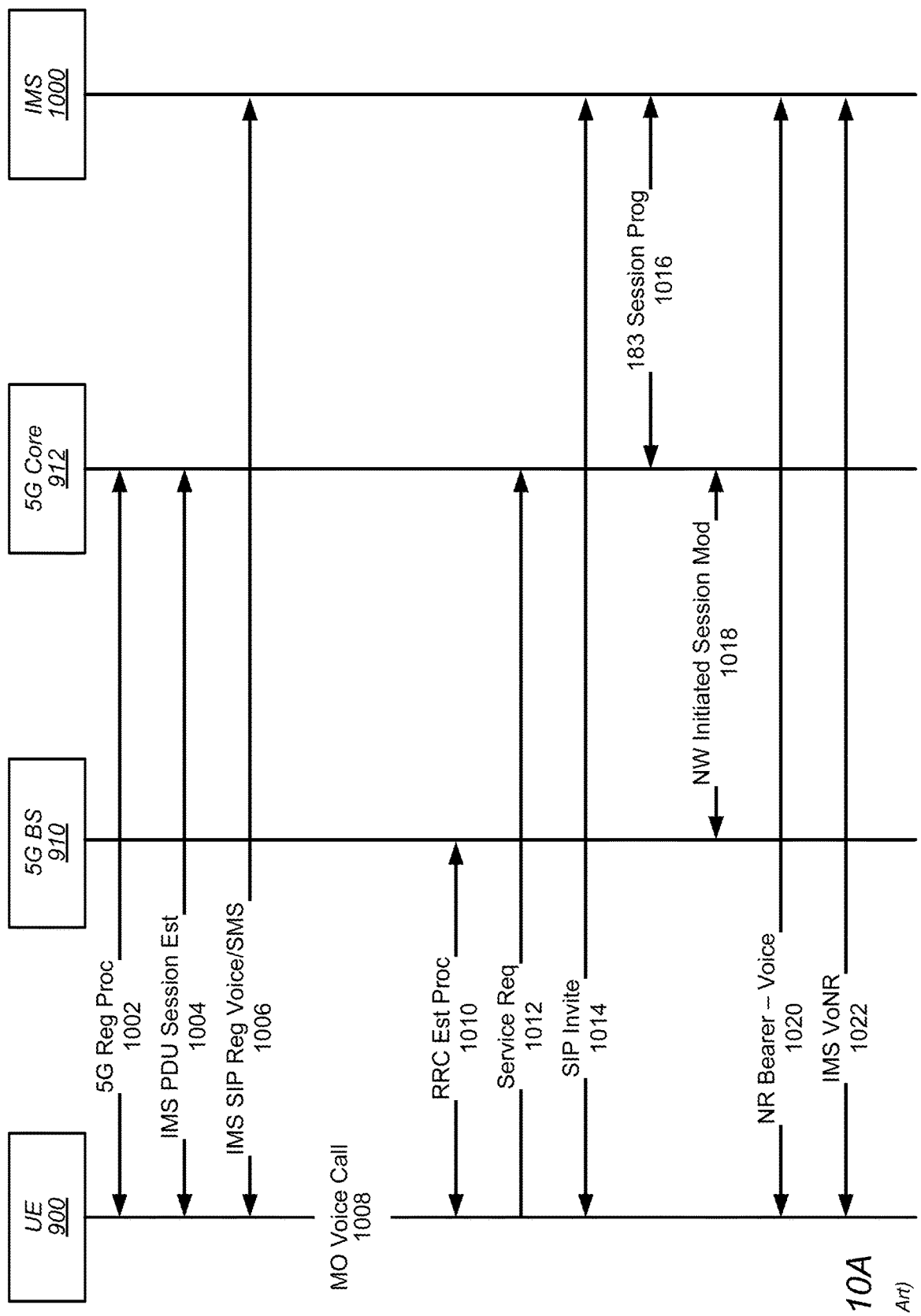
FIG. 10A illustrates an example of a call flow for VoNR.

FIG. 10A illustrates an example of a call flow for VoNR, according to current implementations. As shown, at 1002, UE 900 may perform a 5G registration procedure with 5G core 912. During the procedure, 5G core 912 may indicate support for voice over IMS (VoIMS), e.g., via a voice over packet session (VoPS) parameter with a value of 1. At 1004, UE 900 may perform an IP multimedia subsystem (IMS) protocol data unit (PDU) session establishment procedure with 5G core 912. At 1006, the UE 900 may perform an IMS session initiation protocol (SIP) registration procedure for voice and/or short message service (SMS) support. At 1008, UE 900 may initiate a mobile originated (MO) voice call. At 1010, UE 900 may perform an RRC establishment procedure with 5G base station 910. At 1012, UE 900 may transmit a service request (with a service type set to data) to the 5G core 912. At 1014, UE 900 may send a SIP invite message to IMS 1000. At 1016, IMS 1000 may transmit a 183-session progress message to 5G core 912. At 1018, 5G core 912 and 5G base station 910 may initiate a PDU session modification to setup flow for the IMS voice call. At 1020, IMS 1000 and UE 900 may setup an NR dedicated bearer for the MO voice call. At 1022, UE 900 and IMS 1000 may participate in the IMS voice session over NR.

Figure 10B:
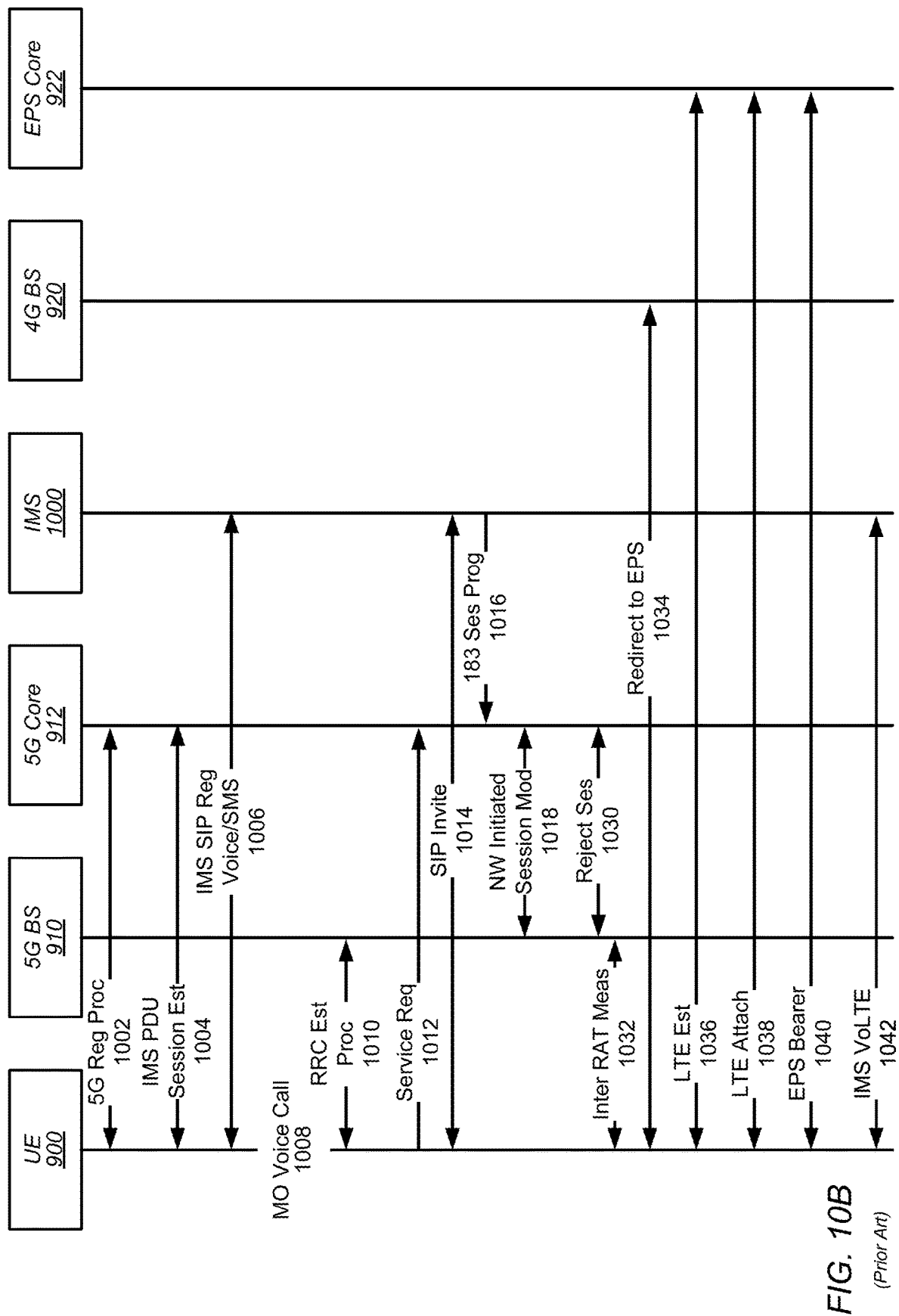
FIG. 10B illustrates an example of a call flow for EPS fallback when N26 interface is not supported.

FIG. 10B illustrates an example of a call flow for EPS fallback when the N26 interface is not supported, according to current implementations. As shown, at 1002, UE 900 may perform a 5G registration procedure with 5G core 912. During the procedure, 5G core 912 may indicate support for VoIMS, e.g., via a voice over packet session (VoPS) parameter with a value of 1. Additionally, the 5G core 912 may indicate that the N26 interface is not available, e.g., via an interworking (IWK) N26 parameter with a value of 0. At 1004, UE 900 may perform an IP multimedia subsystem (IMS) protocol data unit (PDU) session establishment procedure with 5G core 912. At 1006, the UE 900 may perform an IMS session initiation protocol (SIP) registration procedure for voice and/or short message service (SMS) support. At 1008, UE 900 may initiate a mobile originated (MO) voice call. At 1010, UE 900 may perform an RRC establishment procedure with 5G base station 910. At 1012, UE 900 may transmit a service request (with a service type set to data) to the 5G core 912. At 1014, UE 900 may send a SIP invite message to IMS 1000. At 1016, IMS 1000 may transmit a 183-session progress message to 5G core 912. At 1018, 5G core 912 and 5G base station 910 may initiate a PDU session modification to setup flow for the IMS voice call. At 1030, the PDU session modification may be rejected with an indication that IMS voice fallback to EPS is in progress. At 1032, UE 902 may perform inter-RAT measurements. At 1034, the UE 900 may be redirected to 4G base station 920. At 1036, UE 900 may establish LTE security context with EPS core 922. At 1038, the UE may perform an LTE attach procedure with PDN establishment with the EPS core 922. At 1040, EPS core 922 and UE 900 may setup an EPS dedicated bearer for the MO voice call. At 1042, UE 900 and IMS 1000 may participate in the IMS voice session over LTE.

As noted, VoNR may not be available (supported) by most networks, at least in initial implementations, due to unavailability of dedicated bearer resources in 5G RAN for voice over 5G NR. In such instances, the network may re-direct the UE to 4G (e.g., LTE) for voice calls, leading to call initiation delays and poor user experience, especially when the N26 interface is not supported. In some instances, VoNR may not be possible due to access barring by a network. In some instances, VoNR may not be possible due to lower layer issues, IMS SIP message timeouts, IMS SIP rejection, IMS SIP errors, and so forth.

Embodiments described herein provide systems, methods, and/or mechanisms to enhance EPS fallback upon initiation of a voice call by a mobile station over 5G NR. In some embodiments, an IMS registration procedure may be skipped (omitted) when falling back to EPS. In some embodiments, a SIP invite procedure may be skipped (omitted) when falling back to EPS. In some embodiments, when a voice call is triggered over 5G NR and a 5G base station (such as gNB 604) initiates a connection release procedure with redirection, a UE, such as UE 106, may:

- ensure an LTE cell on which the UE camps post re-direction has the same registered public land mobile network (RPLMN) or equivalent PLMN (E-PLMN) as the 5G NR cell where the call was initiated;
- ensure the LTE cell supports VoLTE (e.g., via a check of the IMS VoPS support in tracking area update (TAU) procedure); and/or
- depending on the availability of N26 interface, once the UE camps on the re-directed LTE cell, the UE may perform a TAU procedure when N26 interface is supported or an attach procedure when N26 interface is not supported.

In some embodiments, the UE may avoid double access barring checks and/or avoid access baring check on LTE when access barring parameters are more conservative on LTE. For example, since an access barring check may have already been completed via NR (e.g., upon initiation of the voice call), the UE may need not apply any further barring checks when initiating RRC connection over the LTE cell as part of the voice call fallback procedure (e.g., for the RRC connection established for sending the TAU may be alleviated from any barring checks). Additionally, during EPS fallback, as the UE moves from NR to LTE, the network (e.g., the 4G network) may be aware of EPS fallback procedure for voice calls and may alleviate any access barring checks for the duration of voice service.

In some embodiments, the UE may avoid an access barring check on LTE if the access barring parameters are more conservative on LTE as compared to NR during the EPS fallback procedure. For example, if the barring factor is p30 on NR (e.g., only 30 out of 100 call attempts are allowed) while the barring factor is p70 on LTE (e.g., 70 out of 100 call attempts are allowed), then when the UE is re-directed to LTE as part of EPS fallback, the UE may skip initiating any access barring checks on LTE.

In some embodiments, access barring parameters for voice calls due to an EPS fallback procedure may be introduced in an LTE SIB-2. The access barring parameters may allow the network to select a different set of access barring parameters for native VoLTE calls initiated on LTE as opposed to EPS fallback voice calls. For example, access barring parameters may include: ssac-BarringForMMTEL-Voice-r12 AC-BarringConfig OPTIONAL, —Need OP ssac-BarringForMMTEL-Video-r12 AC-BarringConfig OPTIONAL—Need OP ssac-BarringForMMTEL-EpsFallbackVoice-r16 AC-BarringConfig OPTIONAL, —Need OP Thus, the network may relax access barring parameters for EPS fallback voice calls as compared to native LTE voice calls, e.g., since the network may presume an access barring check via 5G NR has already been performed.

In some embodiments, if the UE is barred access on LTE and/or if LTE is experiencing random access channel (RACH) failures, the UE may transition back to 5G NR and transmit a SIP cancel request (e.g., a "SIP CANCEL" message with "RELEASE_CAUSE" set to "EPS-fallback failure") to allow the UE's context to be released by an IMS server. In some embodiments, such action may avoid "zombie" sessions associated with the UE from lingering at the IMS server since the IMS SIP invite may have been successfully sent when the UE was on 5G NR at call initiation. In some embodiments, 3GPP TS 24.229, section 7.2A.18.11.2, Table 7.2A.18.11-2 may be updated to reflect a cause value for EPS fallback failure for protocol value "RELEASE_CAUSE." In some embodiments, section U.3.1.x may be updated to reflect such changes, e.g.:

When the EPS fallback procedure fails due to access is barred in EPS (access class barring, EAB, ACDC, or NAS signaling connection establishment) as described in 3GPP TS 24.301 [8J], or due to lower layer failures on LTE (e.g., RACH failures), . . . .

In some embodiments, when an access attempt for voice services is barred on the current 5G NR cell, the UE may use a multistep approach to conduct a voice call over NR. Note that access barring in 5G NR may be broadcast in a SIB-1 message via a uac-BarringForCommon parameter and a uac-BarringPerPLMN-List parameter. Additionally, the network may apply a barring factor that can be any value from p00 (all calls barred) to p95 (5% of calls barred) and the UE may pick a random number between 0-100, where if the random number picked is greater than the barring factor, services are barred. Note that uac-BarringPerPLMNList parameters may be applicable to an entire PLMN whereas uac-BarringForCommon may be applicable to an individual cell. Thus, in some embodiments, if uac-BarringPerPLMN-List parameter (or information element) is not included in the SIB-1 message (e.g., is absent) and the UE is barred for a voice call as part of uac-BarringForCommon, the UE may attempt to re-select to another 5G NR cell in same PLMN prior to attempting an EPS fallback. In some embodiments, if uac-BarringPerPLMN-List parameter (or information element) is present and UE is barred for a voice call, the UE may attempt to transition (or move) to an E-PLMN in the 5G core network, prior to attempting an EPS fallback. In some embodiments, if neither of the prior conditions are satisfied and/or not possible, the UE may attempt to transition (or move) out of the 5G core network if the UE is barred for a voice call (or voice services).

In some embodiments, to mitigate call establishment delay that may be associated with UE attempts to re-select to a new cell, the UE may decide to fallback to EPS for voice services a-priori (e.g., whenever the NR cell has a non p100 access barring factor for voice services). In other words, even before a user attempts a voice call, the UE may decide to fallback to EPS in order to be on a system which reliably allows voice service over IMS.

In some embodiments, the UE may pre-select and store a random number irrespective of a voice call trigger from the user. Thus, the UE may know prior to a voice call trigger whether the UE will be barred for voice services. In some embodiments, when the UE detects that voices services will be barred (e.g., based on the random number selected), the UE may attempt to transition to another 5G NR cell in same PLMN (e.g., if current cell is barred) or to an E-PLMN (e.g., if current PLMN is barred).

In some embodiments, if VoNR is not possible due to lower layer issues (e.g., such as RACH failures and/or RRC connection failures), the UE may, after experiencing lower layer failures for a specified amount of time, fallback to LTE and re-attempt a service request over LTE. In some embodiments, if IMS SIP messages are timing out on NR, the UE may fallback to LTE and trigger voice call as circuit switch fallback (CSFB) since IMS SIP level failures may indicate problems with the core network (e.g., if the problem is at the core network, LTE may also experience similar issues). In some embodiments, if IMS SIP is rejected and/or if there is an IMS SIP failure on NR, the UE may fallback to LTE and initiate a re-registration for IMS. In some embodiments, if the IMS SIP is rejected on LTE, the UE may move to CSFB for voice calls. In some embodiments, if IMS SIP is rejected and/or if there is an IMS SIP failure on NR, the UE may fallback to LTE and trigger voice calls as CSFB. In some embodiments, if the UE receives an RRC connection rejection on NR as part of voice call establishment, the UE may fallback to LTE and initiate calls as VoLTE.

In some embodiments, if VoNR is not possible due to user plane resources not being available for IMS PDU, the UE may fallback to LTE and re-initiate IMS registration over LTE followed by IMS SIP signaling for a voice call. In some embodiments, the UE may fallback to LTE based on a network response to a service request including a "PDU session reactivation result" IE along with a cause of "insufficient user-plane resources for the PDU session" for the IMS PDU. Note that such a response from the network may be a service accept or service reject response. In some embodiments, the UE may fallback to LTE and initiate a voice call as VoLTE if the UE receives a network service reject message with a rejection cause of any, any combination of, and/or all of "congestion", "maximum number of PUD sessions reached", and/or "restricted service area."

In some embodiments, if the N26 interface is not supported and VoNR is not possible (e.g., due to access barring, IMS VoPS not being supported in 5G, REGISTRATION ACCEPT, and so forth; in other words in any instance in which EPS fallback may be triggered), the UE may switch to a dual registration mode to allow IMS registration to be done over EPS, thereby allowing the voice call to proceed as a VoLTE call. In some embodiments, this may aid in reducing call establishment delays for voice calls since the EPS fallback phase may be eliminated.

FIGS. 11A-D and 12A-D illustrate signaling diagrams of examples of methods for EPS fallback enhancement, according to some embodiments. The signaling shown in FIGS. 11 and 12 may be used in conjunction with any of the systems, methods, or devices shown in the Figures, among other devices. In various embodiments, some of the signaling shown may be performed concurrently, in a different order than shown, or may be omitted. Additional signaling may also be performed as desired.

Figure 11A:
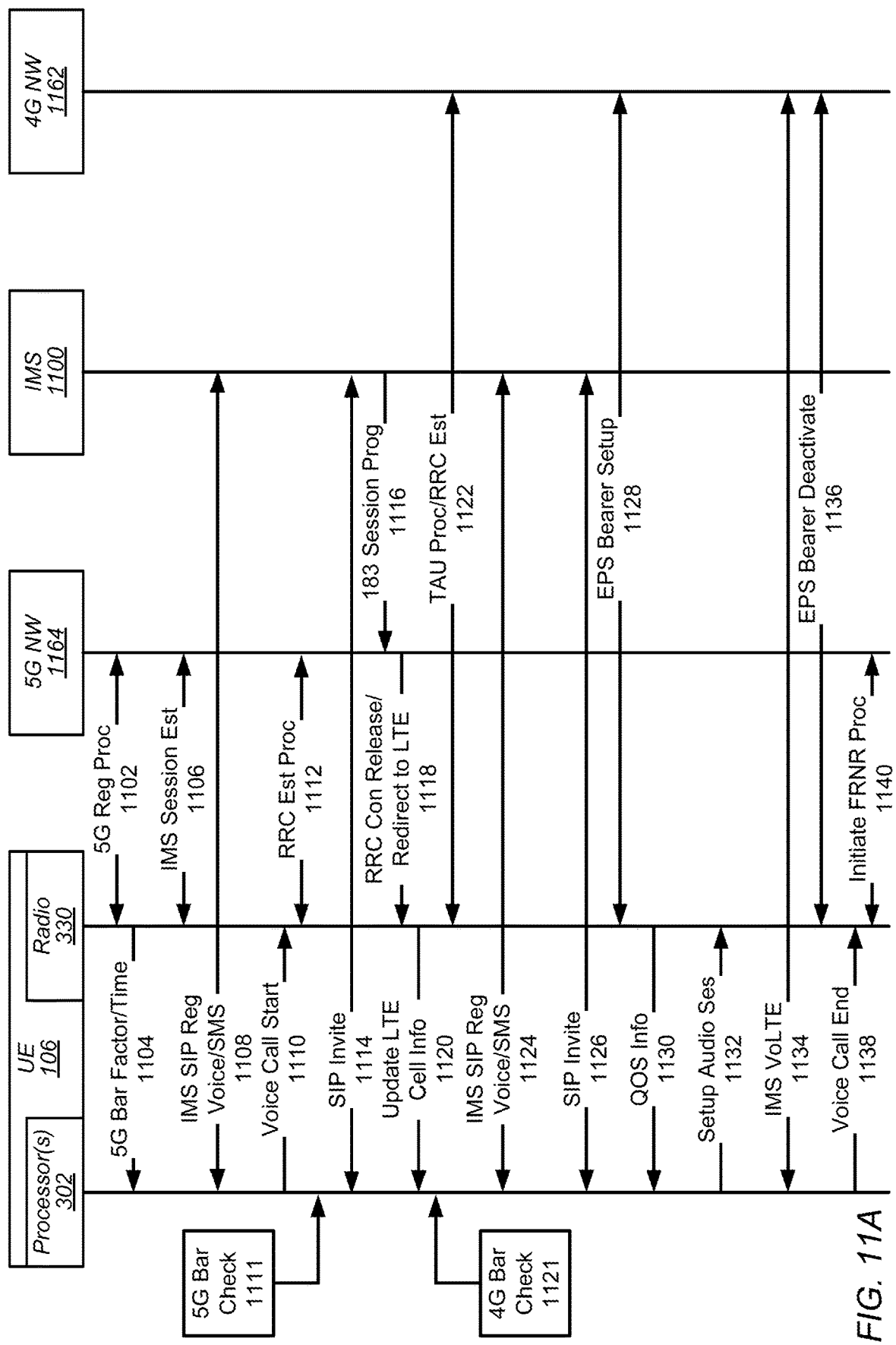
FIGS. 11A-D illustrate examples of EPS fallback when 5G NR dedicated resources are unavailable, according to some embodiments.
Figure 11B:
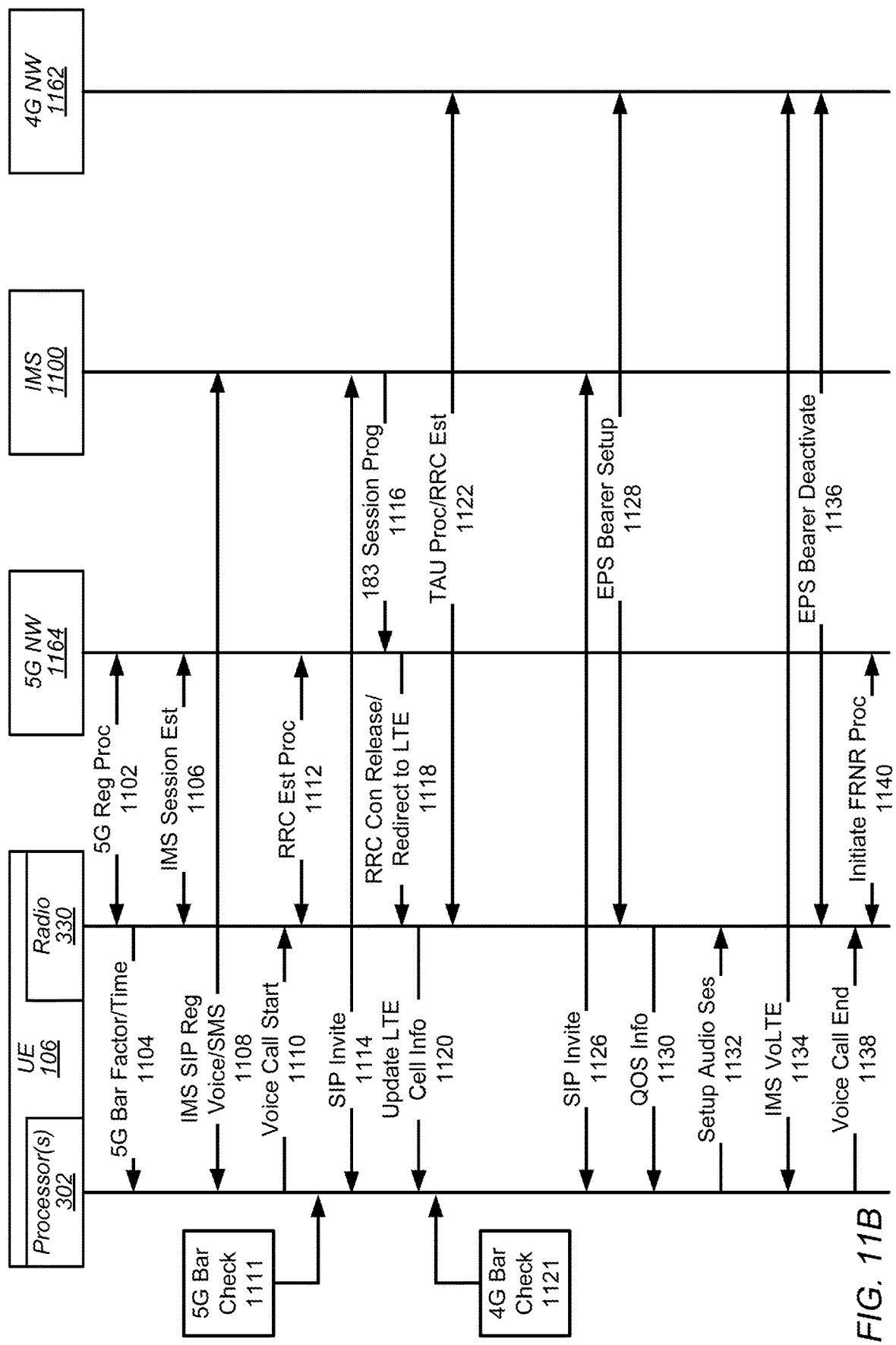
Figure 11C:
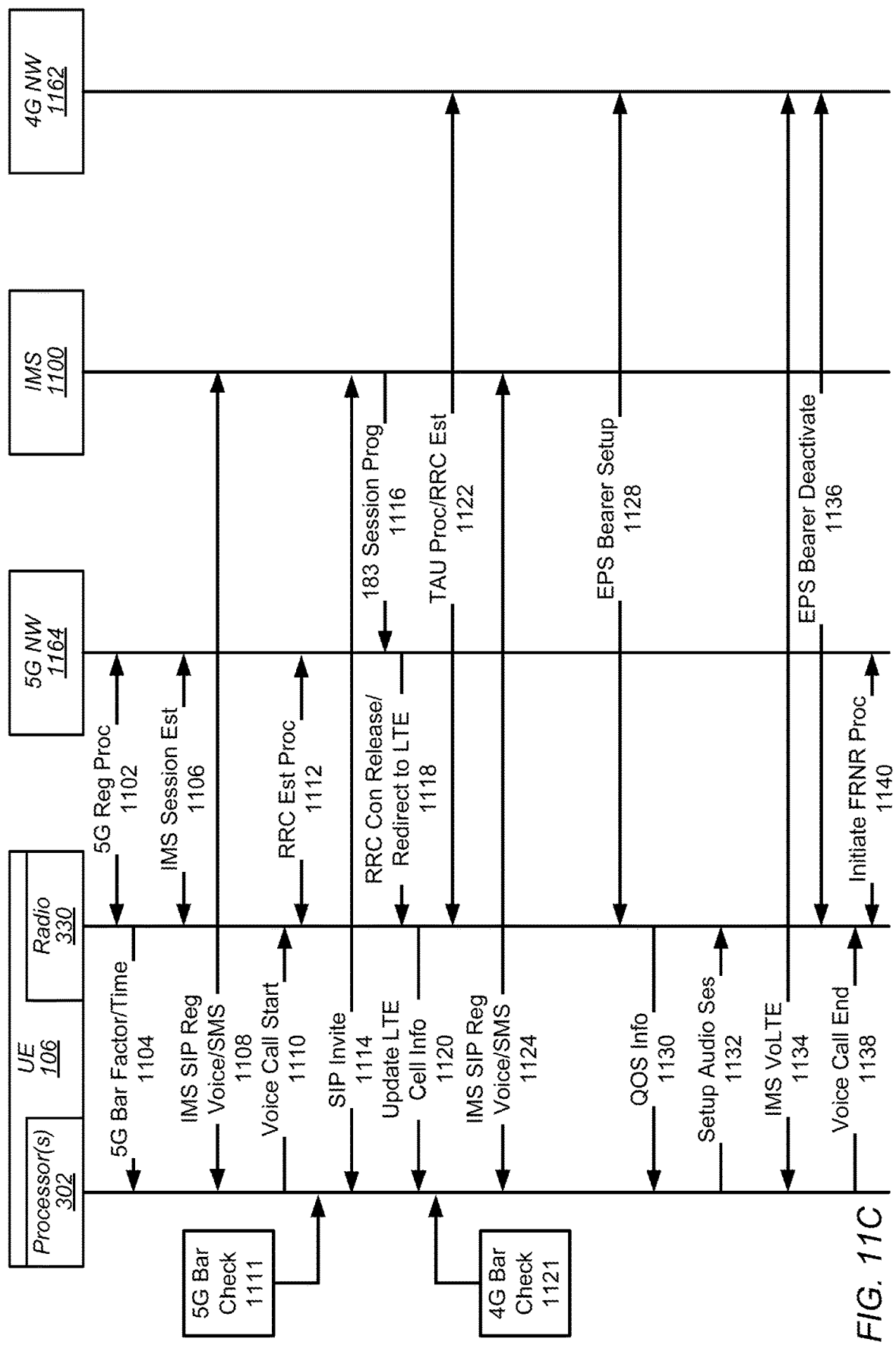
Figure 11D:
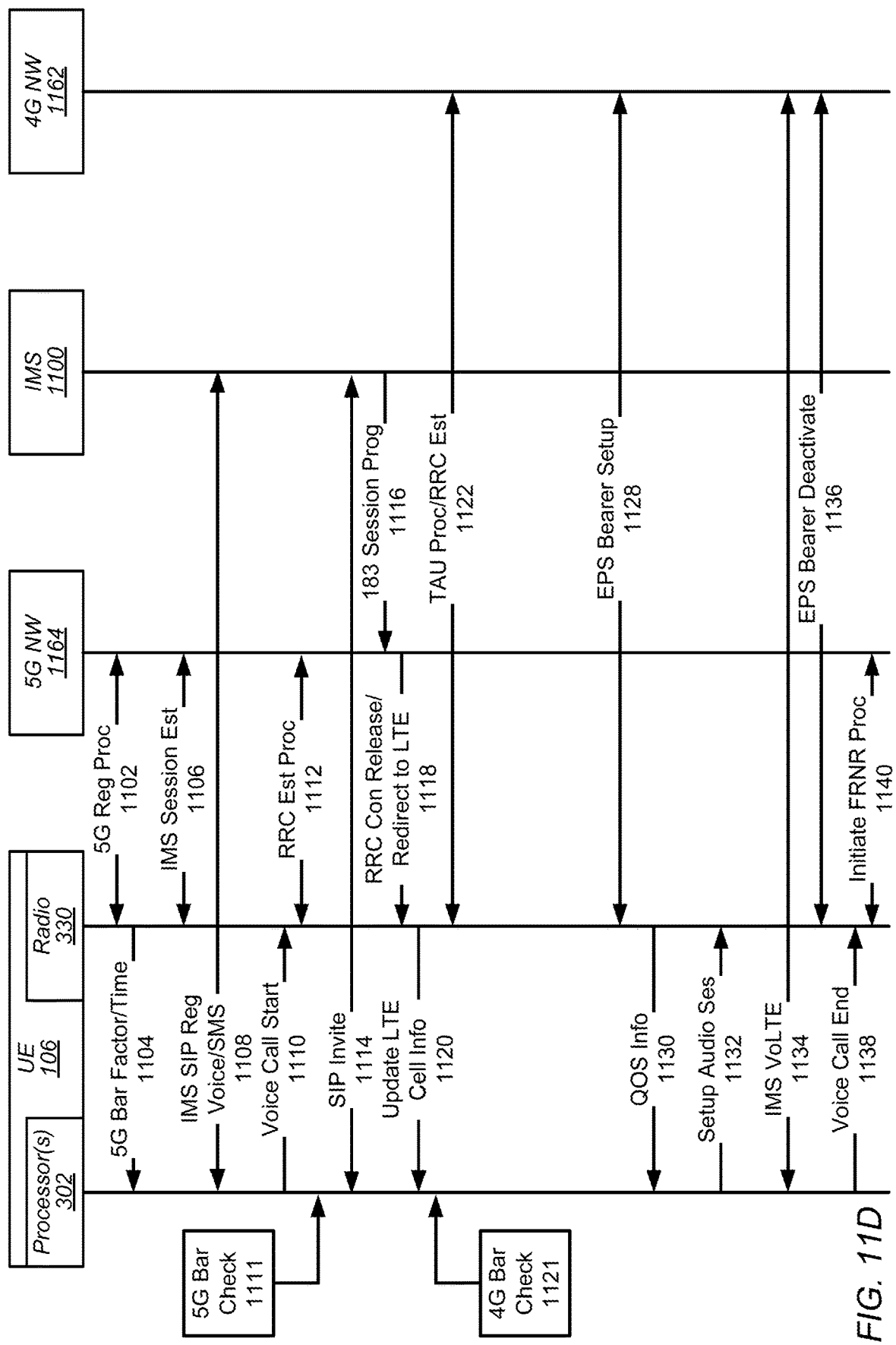

FIGS. 11A-D illustrate examples of EPS fallback when 5G NR dedicated resources are unavailable, according to some embodiments. At 1102, UE 106, which may include a baseband layer (e.g., radio 330) and an application layer (e.g., processor(s) 302) (e.g., as described herein), may initiate a registration procedure with 5G network 1164. 5G network 1104 may include one or more base stations, such as gNB 604, and may operate according to 3GPP Fifth Generation New Radio (5G NR, or NR) radio access technology (RAT). During the registration procedure, 5G network 1164 may indicate that VoNR is supported and that the N26 interface is supported. At 1104, the baseband layer may send access barring parameters (e.g., barring factor and/or barring time) for mobile originated voice calls to the application layer. At 1106, the baseband processor may perform an IMS default PDU session establishment with 5G network 1164. At 1108, the application layer may perform IMS SIP registration for voice and/or SMS and receive NR cell information. At 1110, the application layer may initiate a mobile originated voice call. At 1111, UE 106 may perform an access barring check for 5G NW 1104. At 1112, assuming that UE 106 passes the barring check, the baseband layer may perform an RRC establishment procedure with 5G network 1164. The baseband layer may indicate a cause of the RRC establishment procedure as mobile originated voice call and may also initiate a service request with service type set to data. At 1114, the application layer may perform a SIP invite procedure with IMS 1100 and provide the NR cell information. At 1116, IMS 1100 may send a 183-session progress message to 5G network 1164. The 183-session progress message may indicate that 5G NR dedicated quality of service is unavailable. At 1118, the 5G network 1164 may send an RRC connection release message to the baseband layer of UE 106. The RRC connection release may include a redirection to LTE indication. At 1120, the baseband processor may send an update including LTE cell information to the application layer. In some embodiments, at 1121, the application layer may perform an access barring check for 4G network 1162 (note that in some embodiments, e.g., as described herein, the application layer may skip such an access barring check). At 1122, the baseband processor may perform a tracking area update (TAU) procedure and an RRC establishment procedure with 4G network 1162. In some embodiments, UE 106's IMS context and Internet PDN may be transferred to 4G network 1162. In some embodiments, the TAU procedure may include a follow-on request bit set to 1. At 1124, the application layer may perform IMS SIP registration for voice and/or SMS and receive LTE cell information. At 1126, the application layer may perform a SIP invite procedure with IMS 1100 and provide the LTE cell information. Note that in some embodiments, UE 106 may skip one or both of the IMS SIP registration at 1124 and/or SIP invite procedure at 1126 (e.g., as illustrated by FIGS. 11B-D). At 1128, 4G NW 1128 may perform an EPS bearer setup with the baseband layer. At 1130, the baseband layer may pass quality of service information to the application layer. At 1132, the application layer may setup the audio session with the baseband layer. At 1134, the application layer may conduct an IMS VoLTE call with 4G network 1162. At 1136, 4G network 1162 may deactivate the EPS bearer and at 1138, the application layer may indicate ending of the voice call to the baseband layer. At 1140, the baseband layer may initiate an (fast return to NR) FRNR procedure with 5G network 1164 to return to the NR network.

Figure 12A:
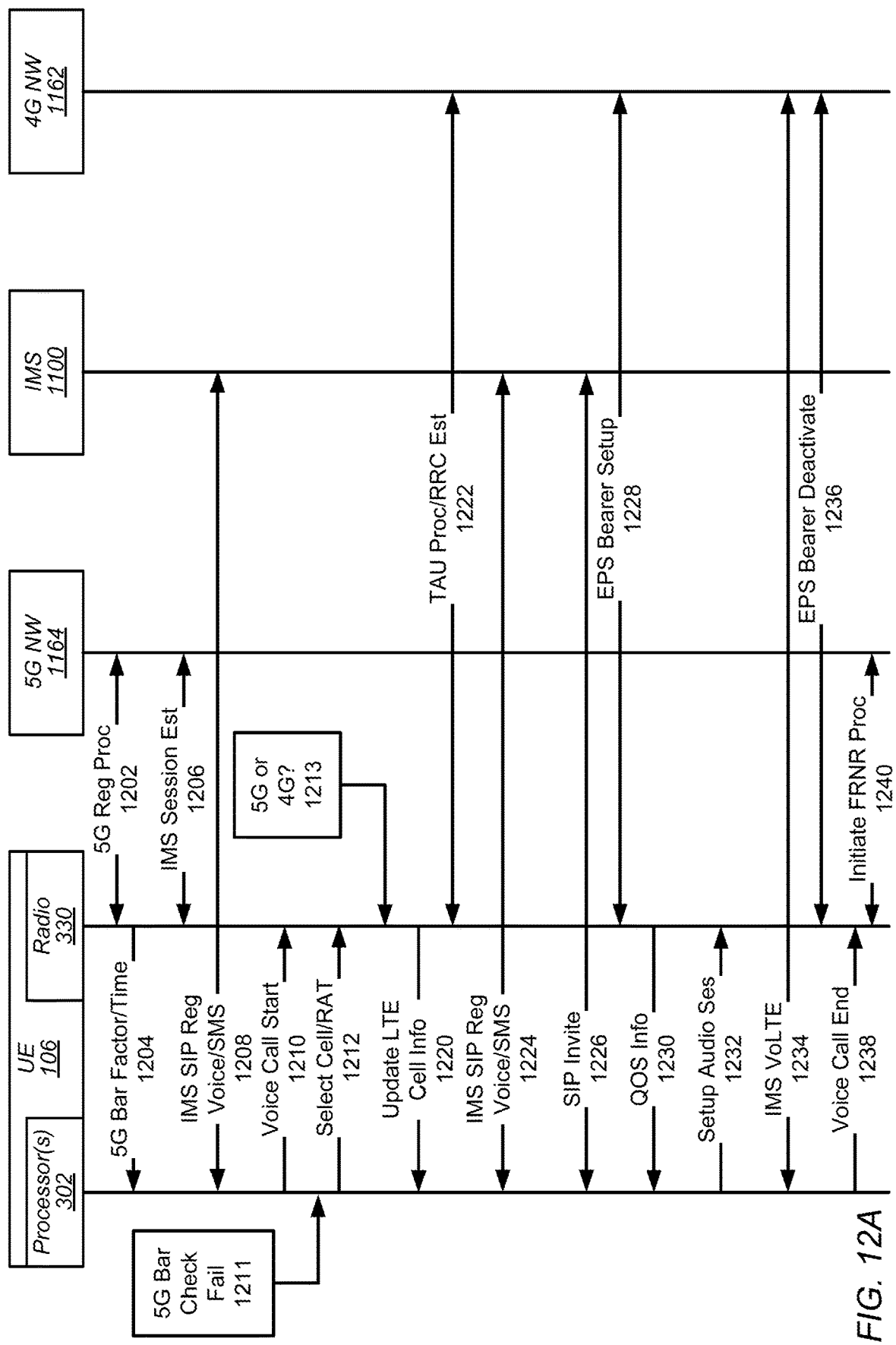
FIGS. 12A-D illustrate examples of EPS fallback when voice call is barred at call establishment, according to some embodiments.
Figure 12B:
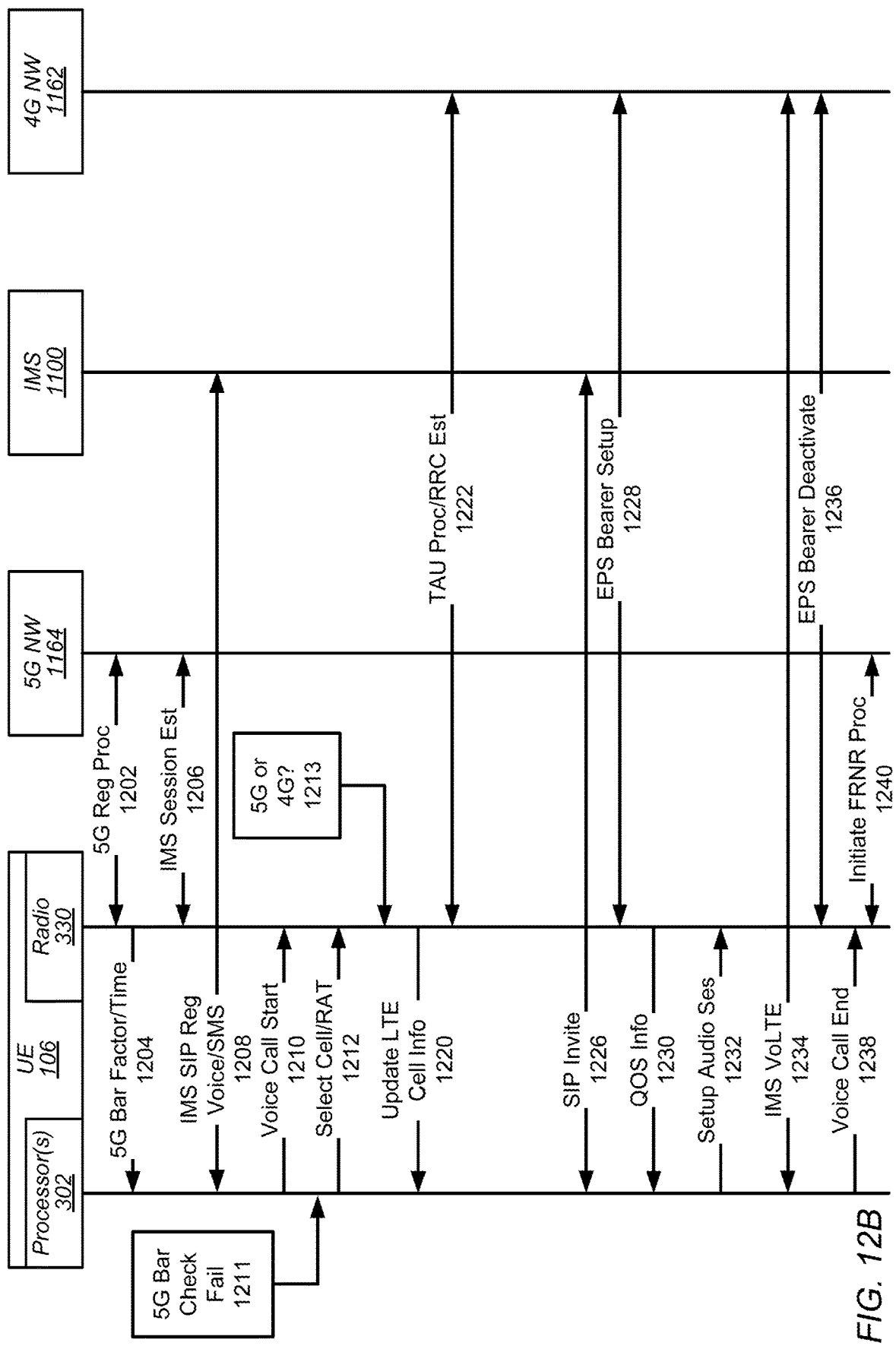
Figure 12C:
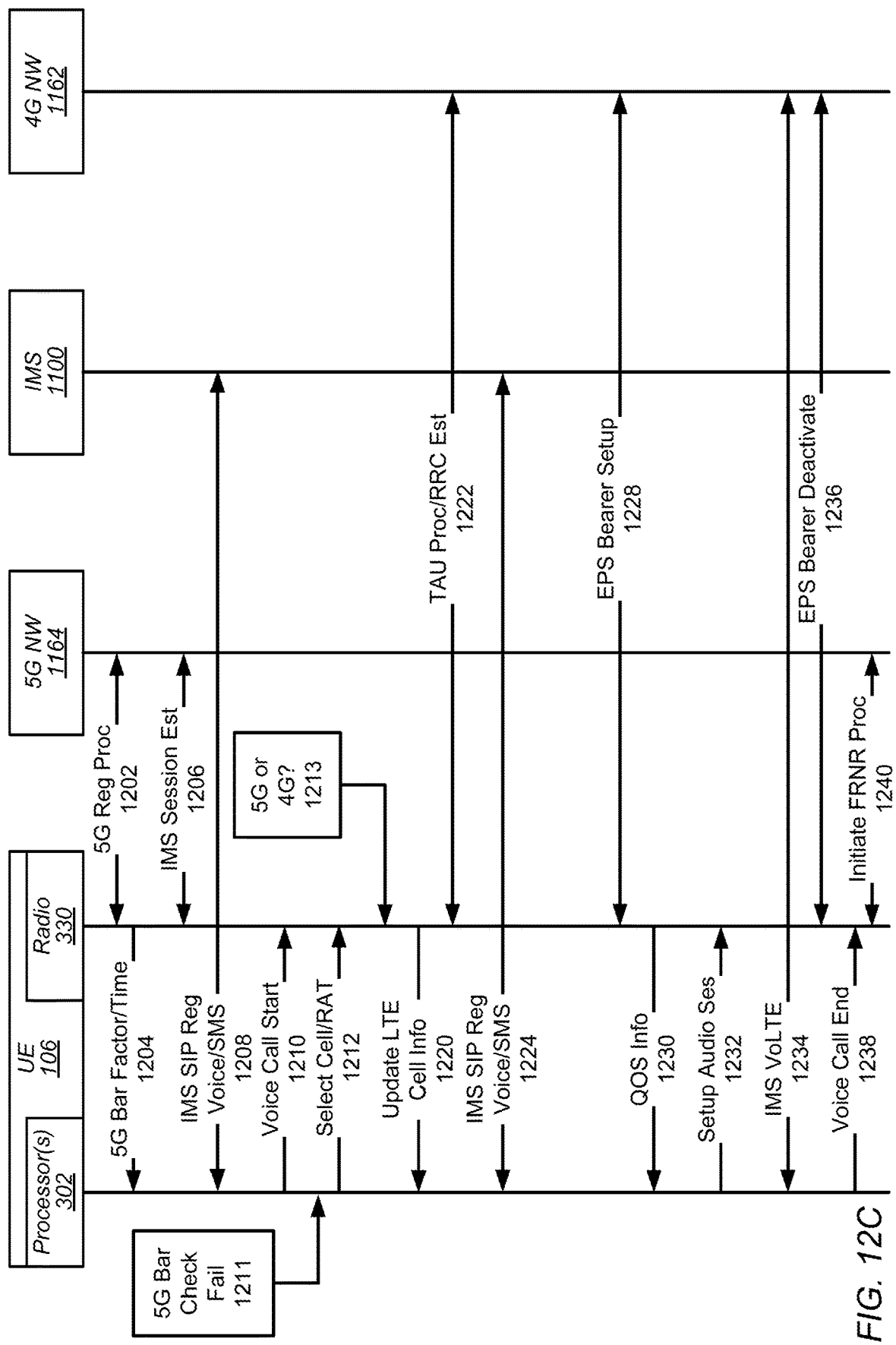
Figure 12D:
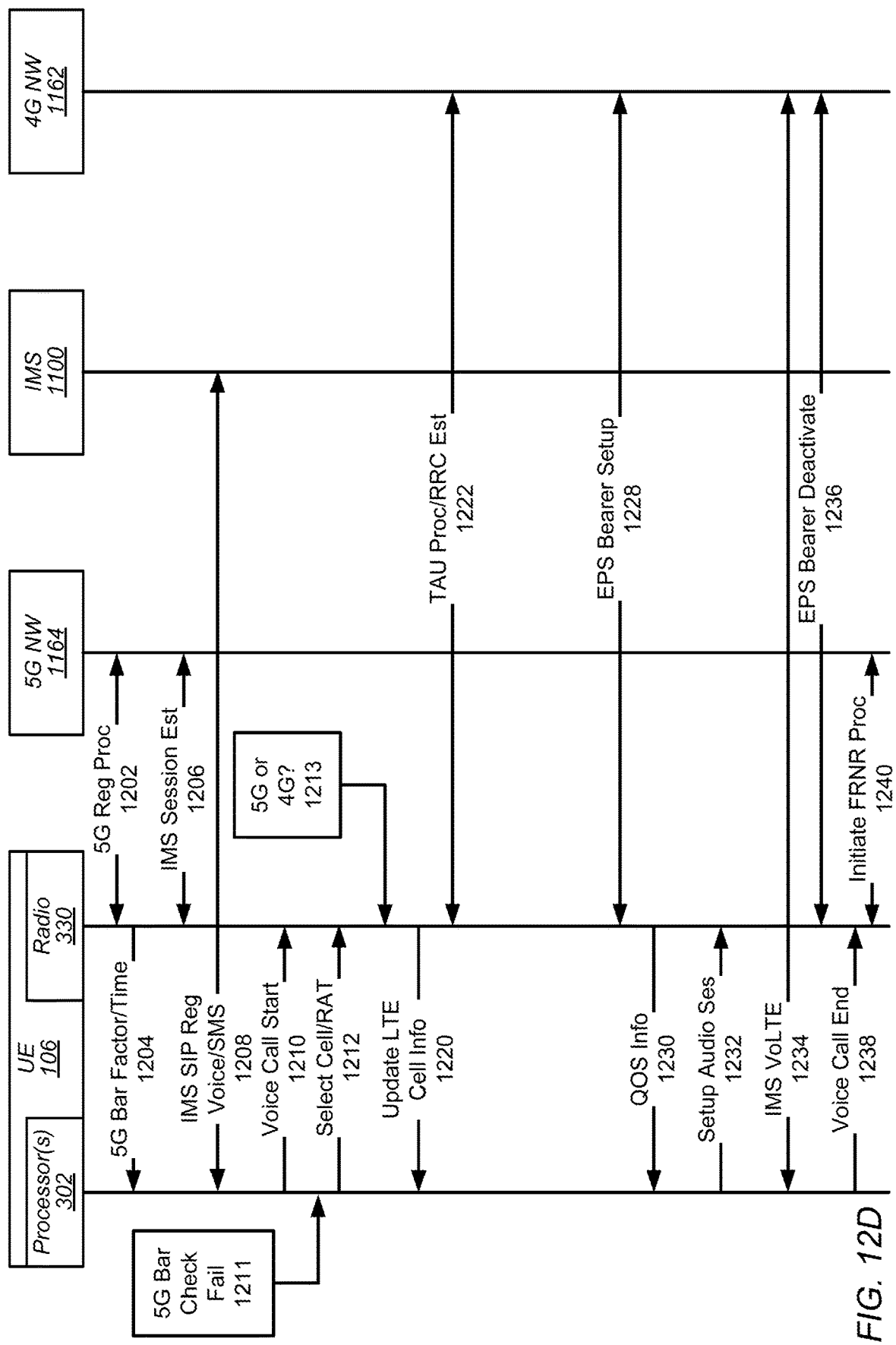

FIGS. 12A-D illustrate examples of EPS fallback when voice call is barred at call establishment, according to some embodiments. At 1202, UE 106, which may include a baseband layer (e.g., radio 330) and an application layer (e.g., processor(s) 302) (e.g., as described herein), may initiate a registration procedure with 5G network 1164. 5G network 1204 may include one or more base stations, such as gNB 604, and may operate according to 3GPP Fifth Generation New Radio (5G NR, or NR) radio access technology (RAT). During the registration procedure, 5G network 1164 may indicate that VoNR is supported and that the N26 interface is supported. At 1204, the baseband layer may send access barring parameters (e.g., barring factor and/or barring time) for mobile originated voice calls to the application layer. At 1206, the baseband processor may perform an IMS default PDU session establishment with 5G network 1164. At 1208, the application layer may perform IMS SIP registration for voice and/or SMS and receive NR cell information. At 1210, the application layer may initiate a mobile originated voice call. At 1211, UE 106 may perform an access barring check for 5G NW 1204. At 1212, assuming that UE 106 does not pass the barring check, the application layer may request the baseband layer to select a next best cell/RAT. At 1213, the baseband layer may determine whether to move to another NR cell or downgrade to LTE, e.g., when the baseband layer is in an RRC idle state. In some embodiments, when the baseband layer is in an RRC connected or inactive state, the baseband layer may trigger a local connection release prior to determining whether to move to another NR cell or downgrade to LTE. At 1220, the baseband processor may send an update including LTE cell information to the application layer. At 1222, the baseband processor may perform a tracking area update (TAU) procedure and an RRC establishment procedure with 4G network 1162. In some embodiments, UE 106's IMS context and Internet PDN may be transferred to 4G network 1162. In some embodiments, the TAU procedure may include a follow-on request bit set to 1. At 1224, the application layer may perform IMS SIP registration for voice and/or SMS and receive LTE cell information. At 1226, the application layer may perform a SIP invite procedure with IMS 1100 and provide the LTE cell information. Note that in some embodiments, UE 106 may skip one or both of the IMS SIP registration at 1224 and/or SIP invite procedure at 1226 (e.g., as illustrated by FIGS. 12B-D). At 1228, 4G NW 1228 may perform an EPS bearer setup with the baseband layer. At 1230, the baseband layer may pass quality of service information to the application layer. At 1232, the application layer may setup the audio session with the baseband layer. At 1234, the application layer may conduct an IMS VoLTE call with 4G network 1162. At 1236, 4G network 1162 may deactivate the EPS bearer and at 1238, the application layer may indicate ending of the voice call to the baseband layer. At 1240, the baseband layer may initiate and FRNR procedure with 5G network 1164 to return to the NR network.

Figure 13:
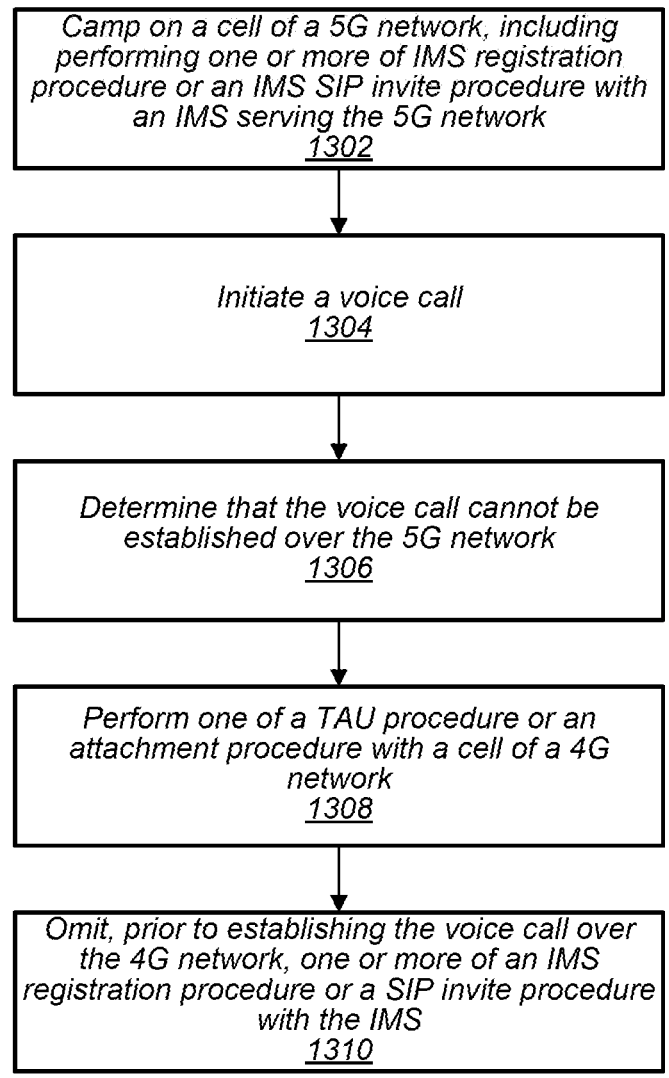
FIGS. 13 and 14 illustrate block diagrams of examples of methods for EPS fallback when establishing a voice call while camped on a 5G network, according to some embodiments.

FIG. 13 illustrates a block diagram of an example of a method for evolved packet system (EPS) fallback when establishing a voice call while camped on a fifth generation (5G) network, according to some embodiments. The method shown in FIG. 13 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1302, a UE, such as UE 106, may camp on a cell (e.g., such as gNB 604) of a 5G network. In some embodiments, the 5G network may operate according to 5G NR. Camping on the cell may include performing one or more of IMS registration procedure or an IMS SIP invite procedure with an IMS serving the 5G network.

At 1304, the UE may initiate a voice call. In some embodiments, the voice call may be initiated over the 5G network, e.g., as described herein.

At 1306, the UE may determine that the voice call cannot be established. In some embodiments, the UE may determine that the voice call cannot be established via the cell and/or over the 5G network. In some embodiments, determining that the voice call cannot be established may include the UE determining that the first cell has a p00 access barring parameter for voice services, e.g., the first cell may bar all voice services. In some embodiments, determining that the voice call cannot be established may include the UE detecting and/or experiencing lower layer failures on the first cell over a specified period of time and determining, based on the lower layer failures occurring for the specified period of time, that the voice call cannot be established over the 5G network. In some embodiments, determining that the voice call cannot be established may include the UE determining that IMS SIP messages are timing out on the 5G network and indicating, while performing one of the TAU procedure or attachment procedure, that the voice call will use circuit switched fallback (CSFB). In some embodiments, determining that the voice call cannot be established may include the UE determining that user plane resources are not available for an IMS protocol data unit (PDU) session. In some embodiments, determining that the voice call cannot be established may include the UE receiving, from the 5G network, a response to a service request that includes an information element that indicates a result of the service request with a value indicating a cause as "insufficient user-plane resources for the PDU session." In some embodiments, determining that the voice call cannot be established may include the UE receiving, from the 5G network, a network service rejection in response to a service request, wherein a rejection cause is at least one of congestion, maximum number of PUD sessions reached, and/or restricted service area.

In some embodiments, determining that the voice call cannot be established may include the UE selecting a random number irrespective of a voice call trigger and comparing the random number to an access barring parameter of the first cell. In such embodiments, the UE may determine, based (at least in part) on the comparison, that the voice call cannot be established via the first cell. Additionally, in such embodiments, the UE may determine that the first cell is barred from the 5G network but a public land mobile network (PLMN) associated with the UE is not barred from the 5G network. In response, the UE may re-select to another cell in the 5G network that is in a common PLMN with the first cell prior to performing one of the TAU procedure or attachment procedure. Further, the UE may determine that a PLMN associated with the UE is barred from the 5G network and transition to an equivalent PLMN in the 5G network prior to performing one of the TAU procedure or attachment procedure.

In some embodiments, determining that the voice call cannot be established may include the UE determining that IMS SIP messages are rejected on the 5G network and initiating an IMS re-registration procedure on the 4G network. In such embodiments, the UE may, in response to failure of the IMS re-registration procedure, indicate that the voice call will use circuit switched fallback (CSFB).

At 1308, the UE may perform one of a TAU procedure or an attachment procedure with a cell of a 4G network. In some embodiments, the 4G network may operate according to LTE. In some embodiments, the IMS may be transferred to the 4G network during one of the TAU procedure or attachment procedure. In some embodiments, the TAU procedure may be performed when the 5G network indicates support of an N26 interface between the 5G network and the 4G network. In some embodiments, the attachment procedure may be performed when the 5G indicates no support of an N26 interface between the 5G network and the 4G network. In some embodiments, the UE may determine, prior to performing one of the TAU procedure or attachment procedure, that the 5G cell and 4G cell are associated with a common registered public land mobile network (RPLMN) or equivalent PLMN (E-PLMN). In some embodiments, the UE may determine, prior to performing one of the TAU procedure or attachment procedure, that the 4G cell supports voice over packet service (VoPS), e.g., such as VoLTE.

At 1310, the UE may omit, prior to establishing the voice call over the 4G network, one or more of an IMS registration procedure or a SIP invite procedure with the IMS.

In some embodiments, the UE may pass an access barring check on the 5G network and omit, based on access barring parameters of the 5G network being more restrictive than access barring parameters of the 4G network, an access barring check on the 4G network. In some embodiments, the UE may receive, from the 4G network, access barring parameters specific to an EPS fallback procedure. In some embodiments, in response to determining that the UE is barred from the 4G network, the UE may perform one or more remedial procedures. For example, the UE may transition back to the 5G network and transmit, to the 5G network, a SIP cancel request to allow a context associated with the UE to be cleared from the IMS.

As another example of a remedial procedure, in some embodiments, in response to determining that the UE is barred from the voice call on the 5G network, the UE may determine that the cell is barred from the 5G network but a public land mobile network (PLMN) associated with the UE is not barred from the 5G network. In such embodiments, the UE may re-select to another cell in the 5G network that is in a common PLMN with the first cell prior to performing one of the TAU procedure or attachment procedure.

As another example of a remedial procedure, in some embodiments, in response to determining that the UE is barred from the voice call on the 5G network, the UE may determine that a public land mobile network (PLMN) associated with the UE is barred from the 5G network. In such embodiments, the UE may transition to an equivalent PLMN in the 5G network prior to performing one of the TAU procedure or attachment procedure.

In some embodiments, as further described herein, the UE may, in response to determining that the 5G network does not support voice calls, collect a list of 4G frequencies and cells that support VoPS co-located with the 5G cell. In some embodiments, the frequencies and cells may be collected base one at least one of frequencies sent by the 5G network in re-direction and/or handover during EPS fallback, past 4G attach and/or TAU procedures performed on a 4G cell co-located with the 5G cell, and/or a 4G frequency list received from an AP Assisted Cell Search (APACS) server. Additionally, upon initiation of the voice call, the UE may use the collected 4G frequencies to search for and camp on a selected 4G cell to proceed with the voice call. In some embodiments, the UE may fail to camp on the selected 4G cell and remove the selected 4G cell and associated frequencies from the list.

VoLTE Instead of EPS Fallback

As noted above, in some implementations, VoNR may not be available (supported), so IMS voice calls may use EPS fallback or RAT fallback in stand-alone mode. Further, EPS fallback may use handover or redirection of voice call to E-UTRAN (LTE). In some instances of EPS fallback using redirection, a UE may have to search for LTE cells and perform an LTE TAU procedure and/or an attach procedure and then proceed with IMS voice call. Errors/delays (e.g., lost SIP messages) during the re-direction may cause delay in voice call establishment of at least 2 to 4 seconds, leading to decrease user experience. In addition, in the case of EPS fallback using handover, initial deployments of 5G NR may have a high rate of NR to LTE handover failures, thus overall voice call performance of EPS fallback may not be as good as current VoLTE. Additionally, using VoLTE instead of EPS fallback while camped on NR in stand-alone without prior knowledge of LTE systems supporting IMS voice may cause the UE to select the wrong LTE system which may also lead to call setup failures and/or long delays.

In some embodiments, a UE, such as UE 106, may cache LTE frequencies which are known to support VoLTE while UE is camped on a co-located NR cell in stand-alone mode. In some embodiments, the UE may gather VoLTE frequencies co-located with current NR cell based on one or more of LTE frequencies sent by NW in re-direction and/or handover during EPS fallback, past LTE attach/TAU procedures done on an LTE cell co-located with current NR cell, and/or LTE frequency list from an APACS server. In some embodiments, when a user initiates a voice call, the UE may use the knowledge of available VoLTE frequencies to search for an LTE cell, camp on the LTE cell, and proceed with IMS voice call over LTE. In some embodiments, if the UE fails to camp on a selected frequency and/or if VoLTE is not supported, the UE may remove the selected frequency from its cached list. In some embodiments, if the UE does not have prior information of VoLTE frequencies and the UE is under NR coverage in stand-alone mode, the UE may revert to using enhanced 3GPP EPS fallback, e.g., as described herein.

Figure 14:
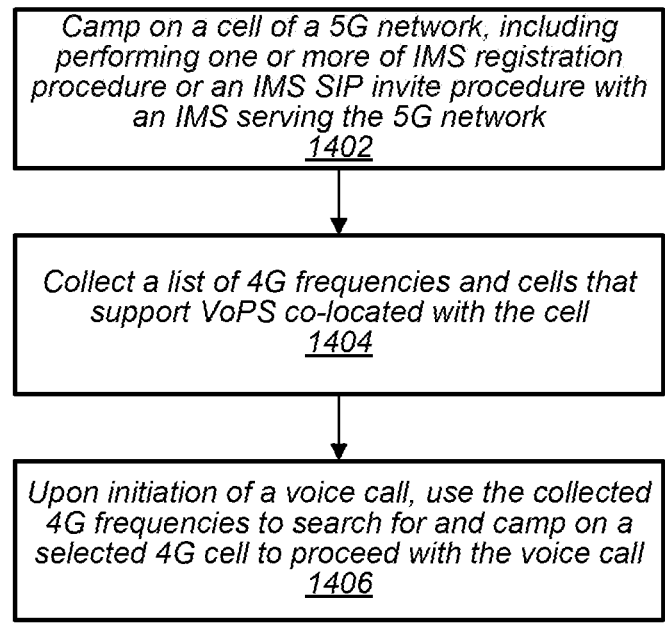

FIG. 14 illustrates a block diagram of another example of a method for evolved packet system (EPS) fallback when establishing a voice call while camped on a fifth generation (5G) network, according to some embodiments. The method shown in FIG. 14 may be used in conjunction with any of the systems, methods, or devices shown in the Figures, among other devices. In various embodiments, some of the method elements shown may be performed concurrently, in a different order than shown, or may be omitted. Additional method elements may also be performed as desired. As shown, this method may operate as follows.

At 1402, a UE, such as UE 106, may camp on a cell (e.g., such as gNB 604) of a 5G network. In some embodiments, the 5G network may operate according to 5G NR. Camping on the cell may include performing one or more of IMS registration procedure or an IMS SIP invite procedure with an IMS serving the 5G network.

At 1404, in response to determining that the 5G network does not support voice calls, collect a list of 4G frequencies and cells that support VoPS co-located with the 5G cell. In some embodiments, the frequencies and cells may be collected base one at least one of frequencies sent by the 5G network in re-direction and/or handover during EPS fallback, past 4G attach and/or TAU procedures performed on a 4G cell co-located with the 5G cell, and/or a 4G frequency list received from an AP Assisted Cell Search (APACS) server.

In some embodiments, to determine that the voice call cannot be established, the UE may determine that the first cell has a p00 access barring parameter for voice services, e.g., the first cell may bar all voice services. In some embodiments, to determine that the voice call cannot be established, the UE may detect and/or experience lower layer failures on the first cell over a specified period of time and determining, based on the lower layer failures occurring for the specified period of time, that the voice call cannot be established over the 5G network. In some embodiments, to determine that the voice call cannot be established, the UE may determine that IMS SIP messages are timing out on the 5G network and indicating, while performing one of the TAU procedure or attachment procedure, that the voice call will use circuit switched fallback (CSFB). In some embodiments, to determine that the voice call cannot be established, the UE may determine that user plane resources are not available for an IMS protocol data unit (PDU) session. In some embodiments, to determine that the voice call cannot be established, the UE may receive, from the 5G network, a response to a service request that includes an information element that indicates a result of the service request with a value indicating a cause as "insufficient user-plane resources for the PDU session." In some embodiments, to determine that the voice call cannot be established, the UE may receive, from the 5G network, a network service rejection in response to a service request, wherein a rejection cause is at least one of congestion, maximum number of PUD sessions reached, and/or restricted service area.

In some embodiments, to determine that the voice call cannot be established, the UE may select a random number (e.g., between 0 and 1 and/or between 0 and 100) irrespective of a voice call trigger and comparing the random number to an access barring parameter of the first cell. In such embodiments, the UE may determine, based (at least in part) on the comparison, that the voice call cannot be established via the first cell. Additionally, in such embodiments, the UE may determine that the first cell is barred from the 5G network but a public land mobile network (PLMN) associated with the UE is not barred from the 5G network. In response, the UE may re-select to another cell in the 5G network that is in a common PLMN with the first cell prior to performing one of the TAU procedure or attachment procedure. Further, the UE may determine that a PLMN associated with the UE is barred from the 5G network and transition to an equivalent PLMN in the 5G network prior to performing one of the TAU procedure or attachment procedure.

In some embodiments, to determine that the voice call cannot be established, the UE may determine that IMS SIP messages are rejected on the 5G network and initiating an IMS re-registration procedure on the 4G network. In such embodiments, the UE may, in response to failure of the IMS re-registration procedure, indicate that the voice call will use circuit switched fallback (CSFB).

At 1406, upon initiation of the voice call, the UE may use the collected 4G frequencies to search for and camp on a selected 4G cell to proceed with the voice call. In some embodiments, the UE may fail to camp on the selected 4G cell and remove the selected 4G cell and associated frequencies from the list.

In some embodiments, the UE may perform one of a TAU procedure or an attachment procedure with a cell of a 4G network. In some embodiments, the 4G network may operate according to LTE. In some embodiments, the IMS may be transferred to the 4G network during one of the TAU procedure or attachment procedure. In some embodiments, the TAU procedure may be performed when the 5G network indicates support of an N26 interface between the 5G network and the 4G network. In some embodiments, the attachment procedure may be performed when the 5G indicates no support of an N26 interface between the 5G network and the 4G network. In some embodiments, the UE may determine, prior to performing one of the TAU procedure or attachment procedure, that the 5G cell and 4G cell are associated with a common registered public land mobile network (RPLMN) or equivalent PLMN (E-PLMN). In some embodiments, the UE may determine, prior to performing one of the TAU procedure or attachment procedure, that the 4G cell supports voice over packet service (VoPS), e.g., such as VoLTE.

In some embodiments, the UE may omit, prior to establishing the voice call over the 4G network, one or more of an IMS registration procedure or a SIP invite procedure with the IMS.

In some embodiments, the UE may pass an access barring check on the 5G network and omit, based on access barring parameters of the 5G network being more restrictive than access barring parameters of the 4G network, an access barring check on the 4G network. In some embodiments, the UE may receive, from the 4G network, access barring parameters specific to an EPS fallback procedure In some embodiments, the UE may pass an access barring check on the 5G network and omit, based on access identification of current procedure being an EPS fallback procedure, an access barring check on the 4G network.

Further Embodiments

In some embodiments, a method for evolved packet system (EPS) fallback when establishing a voice call while camped on a fifth generation (5G) network may include a user equipment device (UE, such as UE 106):

camping on a first cell of a 5G network, including performing one or more of an Internet protocol (IP) multimedia subsystem (IMS) registration procedure or an IMS session initiation protocol (SIP) invite procedure with an IMS serving the 5G network;
initiating a voice call;
determining that the voice call cannot be established;
performing one of a tracking area update (TAU) procedure or an attachment procedure with a second cell of a fourth generation (4G) network co-located with and/or indicated by the 5G network, wherein the IMS is transferred to the 4G network during one of the TAU procedure or attachment procedure; and
omitting, prior to establishing the voice call over the 4G network, one or more of an IMS registration procedure or a SIP invite procedure with the IMS.

In some embodiments, the TAU procedure may be performed when the 5G network indicates support of an N26 interface between the 5G network and the 4G network. In some embodiments, the attachment procedure may be performed when the 5G indicates no support of an N26 interface between the 5G network and the 4G network.

In some embodiments, the method may further include the UE determining, prior to performing one of the TAU procedure or attachment procedure, that first cell and the second cell are associated with a common registered public land mobile network (RPLMN) or equivalent PLMN (E-PLMN).

In some embodiments, the method may further include the UE determining that the second cell supports voice over packet service (VoPS).

In some embodiments, the method may further include the UE passing an access barring check on the 5G network and omitting, based on access barring parameters of the 5G network being more restrictive than access barring parameters of the 4G network, an access barring check on the 4G network.

In some embodiments, the method may further include the UE receiving, from the 4G network, access barring parameters specific to an EPS fallback for voice calls procedure.

In some embodiments, the method may further include the UE, in response to determining that the UE is barred from the 4G network, transitioning back to the 5G network and transmitting, to the 5G network, a SIP cancel request to allow a context associated with the UE to be cleared from the IMS.

In some embodiments, the method may further include the UE, in response to determining that the UE is barred from the voice call on the 5G network, determining that the first cell is barred from the 5G network but a public land mobile network (PLMN) associated with the UE is not barred from the 5G network and re-selecting to another cell in the 5G network that is in a common PLMN with the first cell prior to performing one of the TAU procedure or attachment procedure.

In some embodiments, the method may further include the UE, in response to determining that the UE is barred from the voice call on the 5G network, determining that a public land mobile network (PLMN) associated with the UE is barred from the 5G network and transitioning to an equivalent PLMN in the 5G network prior to performing one of the TAU procedure or attachment procedure.

In some embodiments, the method may further include the UE, in response to determining that the 5G network does not support voice calls, collecting a list of fourth generation (4G) frequencies and cells that support voice over packet services (VoPS) co-located with the first cell and upon initiation of the voice call, using the collected 4G frequencies to search for and camp on a selected 4G cell to proceed with the voice call. In some embodiments, the frequencies may be collected base one at least one of:
frequencies sent by the 5G network in re-direction and/or handover during EPS fallback;
past 4G attach and/or tracking area update (TAU) procedures performed on 4G cell co-located with the first cell; and/or
a 4G frequency list received from a crowdsourced cell deployment database server maintained by the equipment manufacturer or some other entity.

In such embodiments, the method may further include the UE failing to camp on the selected 4G cell and removing the selected 4G cell and associated frequencies from the list.

In some embodiments, determining that the voice call cannot be established may include the UE determining that the first cell has a p00 access barring parameter for voice services.

In some embodiments, determining that the voice call cannot be established may include the UE:
selecting a random number irrespective of a voice call trigger;
comparing the random number to an access barring parameter of the first cell; and
determining, based on the comparison, that the voice call cannot be established via the first cell.

In such embodiments, the method may further include the UE:
determining that the first cell is barred from the 5G network but a public land mobile network (PLMN) associated with the UE is not barred from the 5G network; and
re-selecting to another cell in the 5G network that is in a common PLMN with the first cell prior to performing one of the TAU procedure or attachment procedure.

In some embodiments, the method may further include the UE:
determining that a public land mobile network (PLMN) associated with the UE is barred from the 5G network; and
transitioning to an equivalent PLMN in the 5G network prior to performing one of the TAU procedure or attachment procedure.

In some embodiments, determining that the voice call cannot be established may include the UE:
detecting and/or experiencing lower layer failures on the first cell over a specified period of time; and
determining based on the lower layer failures occurring for the specified period of time, that the voice call cannot be established over the 5G network.

In some embodiments, determining that the voice call cannot be established may include the UE:
determining that IMS SIP messages are timing out on the 5G network; and
indicating, while performing one of the TAU procedure or attachment procedure, that the voice call will use circuit switched fallback (CSFB).

In some embodiments, determining that the voice call cannot be established may include the UE:
determining that IMS SIP messages are rejected on the 5G network; and
initiating an IMS re-registration procedure on the 4G network.

In such embodiments, the method may further include the UE, in response to failure of the IMS re-registration procedure, indicating that the voice call will use circuit switched fallback (CSFB).

In some embodiments, determining that the voice call cannot be established may include the UE determining that user plane resources are not available for an IMS protocol data unit (PDU) session.

In some embodiments, determining that the voice call cannot be established may include the UE receiving, from the 5G network, a response to a service request that includes an information element that indicates a result of the service request with a value indicating a cause as "insufficient user-plane resources for the PDU session."

In some embodiments, determining that the voice call cannot be established may include the UE receiving, from the 5G network, a network service rejection in response to a service request, wherein a rejection cause is at least one of congestion, maximum number of PUD sessions reached, and/or restricted service area.

In some embodiments, the UE may include:
one or more antennas;
one or more radios, wherein each of the one or more radios is configured to perform cellular communication using at least one radio access technology (RAT); and
one or more processors coupled to the one or more radios, wherein the one or more processors and the one or more radios are configured to perform voice and/or data communications;
wherein the one or more processors are configured to cause the UE to perform the method.

In some embodiments, a non-transitory computer readable memory medium storing program instructions executable by processing circuitry to cause the UE to perform the method.

In some embodiments, a method for evolved packet system (EPS) fallback when establishing a voice call while camped on a fifth generation (5G) network may include a user equipment device (UE, such as UE 106):
camping on a first cell of a 5G network, including performing one or more of an Internet protocol (IP) multimedia subsystem (IMS) registration procedure or an IMS session initiation protocol (SIP) invite procedure with an IMS serving the 5G network;
in response to determining that the 5G network does not support voice calls, collecting a list of fourth generation (4G) frequencies and cells that support voice over packet services (VoPS) co-located with the first cell, wherein the frequencies are collected base one at least one of:
frequencies sent by the 5G network in re-direction and/or handover during EPS fallback;
past 4G attach and/or tracking area update (TAU) procedures performed on 4G cell co-located with the first cell; and/or
a 4G frequency list received from an AP Assisted Cell Search (APACS) server; and
upon initiation of a voice call, using the collected 4G frequencies to search for and camp on a selected 4G cell to proceed with the voice call.

In some embodiments, the method may further include the UE:
failing to camp on the selected 4G cell; and
removing the selected 4G cell and associated frequencies from the list.

In some embodiments, the method may further include the UE:
performing one of a tracking area update (TAU) procedure or an attachment procedure with the selected cell of the 4G network; and
omitting, prior to establishing the voice call over the 4G network, one or more of an IMS registration procedure or a SIP invite procedure with the IMS.

In such embodiments, the IMS may be transferred to the 4G network during one of the TAU procedure or attachment procedure. In some embodiments, the TAU procedure may be performed when the 5G network indicates support of an N26 interface between the 5G network and the 4G network. In some embodiments, the attachment procedure is performed when the 5G indicates no support of an N26 interface between the 5G network and the 4G network.

In some embodiments, the method may further include the UE determining, prior to performing one of the TAU procedure or attachment procedure, that first cell and the selected cell are associated with a common registered public land mobile network (RPLMN) or equivalent PLMN (E-PLMN).

In some embodiments, the method may further include the UE:
passing an access barring check on the 5G network; and
omitting, based on access barring parameters of the 5G network being more restrictive than access barring parameters of the 4G network, an access barring check on the 4G network.

In some embodiments, the method may further include the UE:
passing an access barring check on the 5G network; and
omitting, based on identification of current procedure being an EPS fallback procedure, an access barring check on the 4G network.

In some embodiments, to determine that the 5G network does not support voice calls, the method may further include the UE determining that the first cell has a p00 access barring parameter for voice services.

In some embodiments, to determine that the 5G network does not support voice calls, the method may further include the UE:
selecting a random number irrespective of a voice call trigger;
comparing the random number to an access barring parameter of the first cell; and
determining, based on the comparison, that the voice call cannot be established via the first cell. In some embodiments, the method may further include the UE:
determining that the first cell is barred from the 5G network but a public land mobile network (PLMN) associated with the UE is not barred from the 5G network; and
re-selecting to another cell in the 5G network that is in a common PLMN with the first cell prior to performing one of the TAU procedure or attachment procedure. In some embodiments, the method may further include the UE:
determining that a public land mobile network (PLMN) associated with the UE is barred from the 5G network; and
transitioning to an equivalent PLMN in the 5G network prior to performing one of the TAU procedure or attachment procedure.

In some embodiments, to determine that the 5G network does not support voice calls, the method may further include the UE:
detecting and/or experiencing lower layer failures on the first cell over a specified period of time; and determining based on the lower layer failures occurring for the specified period of time, that the voice call cannot be established over the 5G network.

In some embodiments, to determine that the 5G network does not support voice calls, the method may further include the UE:
  determining that IMS SIP messages are timing out on the 5G network; and
  indicating, while performing one of the TAU procedure or attachment procedure, that the voice call will use circuit switched fallback (CSFB).

In some embodiments, to determine that the 5G network does not support voice calls, the method may further include the UE:
  determining that IMS SIP messages are rejected on the 5G network; and
  initiating an IMS re-registration procedure on the 4G network. In some embodiments, the method may further include the UE, in response to failure of the IMS re-registration procedure, indicating that the voice call will use circuit switched fallback (CSFB).

In some embodiments, to determine that the 5G network does not support voice calls, the method may further include the UE determining that user plane resources are not available for an IMS protocol data unit (PDU) session.

In some embodiments, to determine that the 5G network does not support voice calls, the method may further include the UE receiving, from the 5G network, a response to a service request that includes an information element that indicates a result of the service request with a value indicating a cause as "insufficient user-plane resources for the PDU session."

In some embodiments, to determine that the 5G network does not support voice calls, the method may further include the UE receiving, from the 5G network, a network service rejection in response to a service request, wherein a rejection cause is at least one of congestion, maximum number of PUD sessions reached, and/or restricted service area.

In some embodiments, the method may further include the UE receiving, from the 4G network, access barring parameters specific to an EPS fallback procedure.

In some embodiments, the UE may include:
  one or more antennas;
  one or more radios, wherein each of the one or more radios is configured to perform cellular communication using at least one radio access technology (RAT); and
  one or more processors coupled to the one or more radios, wherein the one or more processors and the one or more radios are configured to perform voice and/or data communications;
  wherein the one or more processors are configured to cause the UE to perform the method.

In some embodiments, a non-transitory computer readable memory medium storing program instructions executable by processing circuitry to cause the UE to perform the method.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment device (UE), comprising:
  one or more antennas;
  one or more radios, wherein each of the one or more radios is configured to perform cellular communication using at least one radio access technology (RAT);
  one or more processors coupled to the one or more radios, wherein the one or more processors and the one or more radios are configured to perform voice and/or data communications;
  wherein the one or more processors are configured to cause the UE to:
    camp on a first cell of a first RAT network, including performing one or more of an initial Internet protocol (IP) multimedia subsystem (IMS) registration procedure or an initial IMS session initiation protocol (SIP) invite procedure with an IMS serving the first RAT network;
    determine, after attempting to initiate a voice call, that the voice call cannot be established;
    determine, prior to performing one of a tracking area update (TAU) procedure or an attachment procedure with a second cell of a second RAT network, that the first cell and the second cell are associated with a common registered public land mobile network (RPLMN) or equivalent PLMN (E-PLMN), wherein the second cell is co-located with and indicated by the first RAT network;
    perform, in response to determining that the first cell and the second cell are associated with the common RPLMN or E-PLMN, one of the TAU procedure or attachment procedure with the second cell, wherein the IMS is transferred to the second RAT network during one of the TAU procedure or attachment procedure, wherein the TAU procedure is performed when the first RAT network indicates support of an N26 interface between the first RAT network and the second RAT network, and wherein the attachment procedure is performed when the first RAT network indicates no support of an N26 interface between the first RAT network and the second RAT network; and initiate the voice call over the second RAT network without first performing a subsequent IMS registration procedure or a subsequent SIP invite procedure with the IMS.

2. The UE of claim 1,
wherein the one or more processors are further configured to cause the UE to:
in response to determining that the UE is barred from the second RAT network, transition back to the first RAT network; and
transmit, to the first RAT network, a SIP cancel request to allow a context associated with the UE to be cleared from the IMS.

3. The UE of claim 2,
wherein the SIP cancel request includes a protocol value set to "RELEASE_CAUSE".

4. The UE of claim 1,
wherein the one or more processors are further configured to cause the UE to:
determine that the second cell supports voice over packet service (VoPS).

5. The UE of claim 1,
wherein the one or more processors are further configured to cause the UE to:
pass an access barring check on the first RAT network; and
omit, based on access barring parameters of the first RAT network being more restrictive than access barring parameters of the second RAT network, an access barring check on the second RAT network.

6. The UE of claim 1,
wherein the one or more processors are further configured to cause the UE to:
receive, from the second RAT network, access barring parameters specific to an EPS fallback for voice calls procedure.

7. The UE of claim 1,
wherein the one or more processors are further configured to cause the UE to:
in response to determining that the UE is barred from the voice call on the first RAT network, performing at least one remedial procedure.

8. The UE of claim 1,
wherein, to determine that the voice call cannot be established, the one or more processors are further configured to cause the UE to determine that the first cell has a p00 access barring parameter for voice services.

9. An apparatus, comprising:
a memory; and
at least one processor in communication with the memory, wherein the at least one processor is configured to:
camp on a first cell of a first network, including performing one or more of an initial Internet protocol (IP) multimedia subsystem (IMS) registration procedure or an initial IMS session initiation protocol (SIP) invite procedure with an IMS serving the first network;
determine, after attempting to initiate a voice call, that the voice call cannot be established;
perform one of a tracking area update (TAU) procedure or an attachment procedure with a second cell of a second network, wherein the second cell is co-located with and indicated by the first network, wherein the IMS is transferred to the second network during one of the TAU procedure or attachment procedure, and wherein the TAU procedure is performed when the first cell indicates support of an N26 interface between the first cell and the second cell, and wherein the attachment procedure is performed when the first cell indicates no support of an N26 interface between the first cell and the second cell; and
transition, in response to determining that the apparatus is barred from the second network, back to the first network; and
transmit, to the first network, a SIP cancel request to allow a context associated with the apparatus to be cleared from the IMS.

10. The apparatus of claim 9,
wherein, to determine that the voice call cannot be established, the at least one processor is configured to determine that the first cell has a p00 access barring parameter for voice services.

11. The apparatus of claim 9,
wherein, to determine that the voice call cannot be established, the at least one processor is configured to:
select a random number between 0 to 1 irrespective of a voice call trigger;
compare the random number to an access barring parameter of the first cell; and
determine, based on the comparison, that the voice call cannot be established via the first cell.

12. The apparatus of claim 11,
where the at least one processor is further configured to:
determine that the first cell is barred from the first network but a public land mobile network (PLMN) associated with the apparatus is not barred from the first network; and
re-selecting to another cell in the first network that is in a common PLMN with the first cell prior to performing one of the TAU procedure or attachment procedure.

13. The apparatus of claim 11,
wherein the at least one processor is further configured to:
determine that a public land mobile network (PLMN) associated with the apparatus is barred from the first network; and
transitioning to an equivalent PLMN in the first network prior to performing one of the TAU procedure or attachment procedure.

14. The apparatus of claim 9,
wherein the SIP cancel request includes a protocol value set to "RELEASE_CAUSE".

15. The apparatus of claim 9
wherein, to determine that the voice call cannot be established, the at least one processor is further configured to determine that the first cell has a p00 access barring parameter for voice services.

16. A non-transitory computer readable memory medium storing program instructions executable by processing circuitry to cause a user equipment device (UE) to:
camp on a first cell of a fifth generation (5G) New Radio (NR) network, including performing one or more of an initial Internet protocol (IP) multimedia subsystem (IMS) registration procedure or an initial IMS session initiation protocol (SIP) invite procedure with an IMS serving the 5G NR network;

determine, after attempting to initiate a voice call, that the voice call cannot be established;

determine, prior to performing one of a tracking area update (TAU) procedure or an attachment procedure with a second cell of a fourth generation (4G) network, that the first cell and the second cell are associated with a common registered public land mobile network (RPLMN) or equivalent PLMN (E-PLMN), wherein the second cell is co-located with and indicated by the 5G NR network;

perform, in response to determining that the first cell and the second cell are associated with the common RPLMN or E-PLMN, one of the TAU procedure or attachment procedure with the second cell, wherein the IMS is transferred to the 4G network during one of the TAU procedure or attachment procedure, wherein the TAU procedure is performed when the first cell indicates support of an N26 interface between the first cell and the second cell, and wherein the attachment procedure is performed when the cell indicates no support of an N26 interface between the first cell and the second cell; and initiate the call over the 4G network without first performing a subsequent IMS registration procedure or a subsequent SIP invite procedure with the IMS.

17. The non-transitory computer readable memory medium of claim 16, wherein the program instructions are further executable to cause the UE to:

in response to determining that the UE is barred from the 4G network, transition back to the 5G NR network; and transmit, to the 5G NR network, a SIP cancel request to allow a context associated with the UE to be cleared from the IMS.

18. The non-transitory computer readable memory medium of claim 17, wherein the SIP cancel request includes a protocol value set to "RELEASE_CAUSE".

19. The non-transitory computer readable memory medium of claim 15, wherein, to determine that the voice call cannot be established, the program instructions are further executable to cause the UE to perform at least one of:

detecting or experiencing lower layer failures on the first cell over a specified period of time and determining based on the lower layer failures occurring for the specified period of time, that the voice call cannot be established over the 5G NR network;

determining that IMS SIP messages are timing out on the 5G NR network and indicating, while performing one of the TAU procedure or attachment procedure, that the voice call will use circuit switched fallback (CSFB);

determining that IMS SIP messages are rejected on the 5G NR network and initiating an IMS re-registration procedure on the 4G network;

determining that user plane resources are not available for an IMS protocol data unit (PDU) session;

receiving, from the 5G NR network, a response to a service request that includes an information element that indicates a result of the service request with a value indicating a cause as "insufficient user-plane resources for the PDU session"; or receiving, from the 5G NR network, a network service rejection in response to a service request, wherein a rejection cause is at least one of congestion, maximum number of PUD sessions reached, or restricted service area.

20. The non-transitory computer readable memory medium of claim 15, wherein the program instructions are further executable to cause the UE to:

in response to failure of the IMS registration procedure, indicate that the voice call will use circuit switched fallback (CSFB).

* * * * *